US012568530B2

(12) United States Patent
Kim et al.

(10) Patent No.: US 12,568,530 B2
(45) Date of Patent: Mar. 3, 2026

(54) TRIGGERED TXOP SHARING (TXS) TIME TERMINATION

(71) Applicant: Ofinno, LLC, Reston, VA (US)

(72) Inventors: Jeongki Kim, Seoul (KR); Kiseon Ryu, McLean, VA (US); Esmael Hejazi Dinan, McLean, VA (US); Leonardo Alisasis Lanante, Reston, VA (US)

(73) Assignee: Ofinno, LLC, Reston, VA (US)

( * ) Notice: Subject to any disclaimer, the term of this patent is extended or adjusted under 35 U.S.C. 154(b) by 359 days.

(21) Appl. No.: 18/108,707

(22) Filed: Feb. 13, 2023

(65) Prior Publication Data

US 2023/0262766 A1 Aug. 17, 2023

Related U.S. Application Data

(60) Provisional application No. 63/309,675, filed on Feb. 14, 2022.

(51) Int. Cl.
H04W 74/08 (2024.01)
H04W 74/0816 (2024.01)

(52) U.S. Cl.
CPC .............................. H04W 74/0816 (2013.01)

(58) Field of Classification Search
CPC ............. H04W 74/0816; H04W 74/06; H04W 74/006
See application file for complete search history.

(56) References Cited

U.S. PATENT DOCUMENTS

| | | | |
|---|---|---|---|
| 2019/0386714 A1* | 12/2019 | Yang ................. | H04W 74/0816 |
| 2025/0016701 A1* | 1/2025 | Campbell ........... | H04L 65/4015 |
| 2025/0048428 A1* | 2/2025 | Lou ................... | H04W 74/0866 |

OTHER PUBLICATIONS

IEEE 802.11-21/0268r8; Mar. 2021; IEEE P802.11 Wireless LANs; PDT: Channel access for Triggered TXOP Sharing; Author(s): Dibakar Das et al.
IEEE 802.11-14/0270r1; Feb. 2021; Resolving TBDs in Triggered SU operation; Author(s): Dibakar Das et al.
IEEE 802.11-21/1236r3; Aug. 2021; IEEE P802.11 Wireless LANs; CR for Clause 35.2.1.3; Author(s): Dibakar Das et al.
IEEE 802.11-21/1731r4; Oct. 2021; IEEE P802.11 Wireless LANs; CR for remaining CIDs on Triggered TXOP Sharing Procedure-part 1; Author(s): Dibakar Das et al.
IEEE P802.11be/D1.3, Nov. 2021; Section 9.3.1.22 Trigger frame format.

* cited by examiner

*Primary Examiner* — Walli Z Butt
(74) *Attorney, Agent, or Firm* — Yasser Mourtada; Kavon Nasabzadeh; James Bender

(57) ABSTRACT

A station (STA) receives, from an access point (AP), a first frame indicating a first time period of a transmission opportunity (TXOP); and a triggered TXOP sharing (TXS) mode. The STA transmits, to the AP or to a peer STA, based on the TXS mode, a second frame during the first time period. The STA transmits, to the AP, during the first time period, a third frame indicating termination of the first time period.

20 Claims, 20 Drawing Sheets

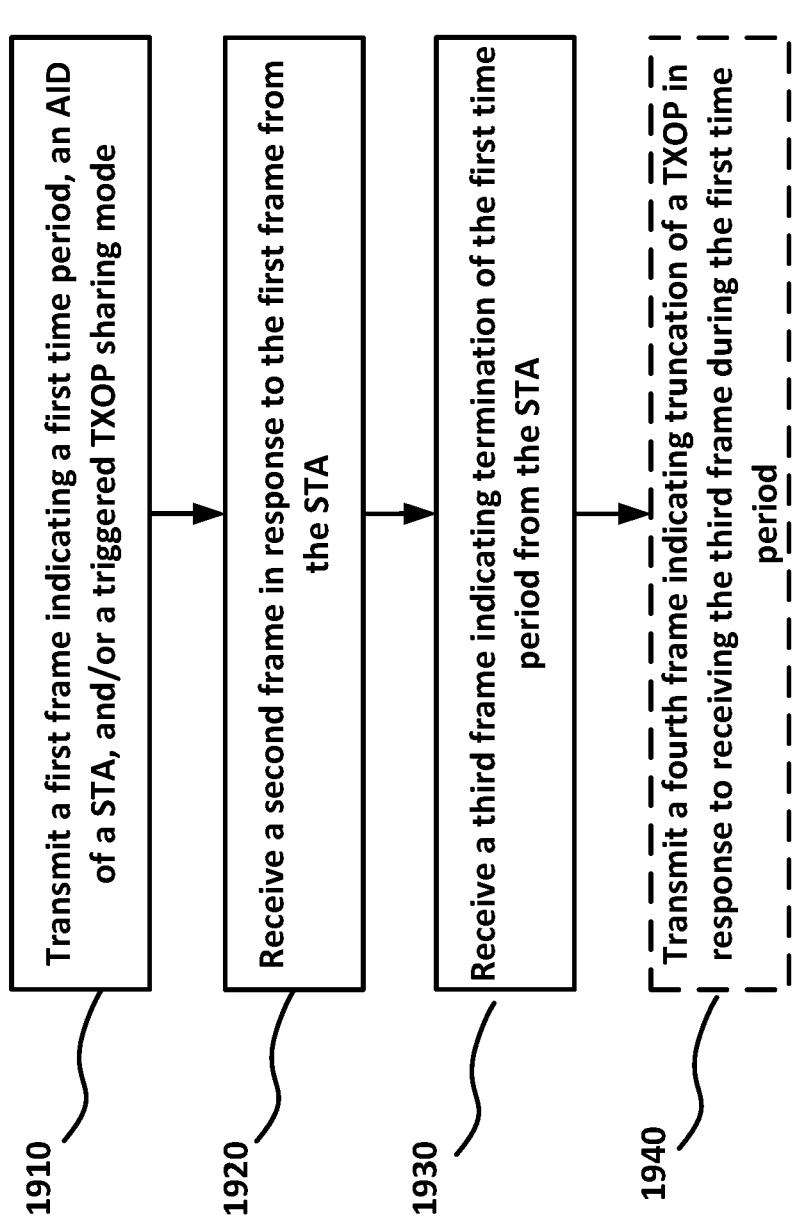

Transmit a first frame indicating a first time period, an AID of a STA, and/or a triggered TXOP sharing mode

1910

Receive a second frame in response to the first frame from the STA

1920

Receive a third frame indicating termination of the first time period from the STA

1930

Transmit a fourth frame indicating truncation of a TXOP in response to receiving the third frame during the first time period

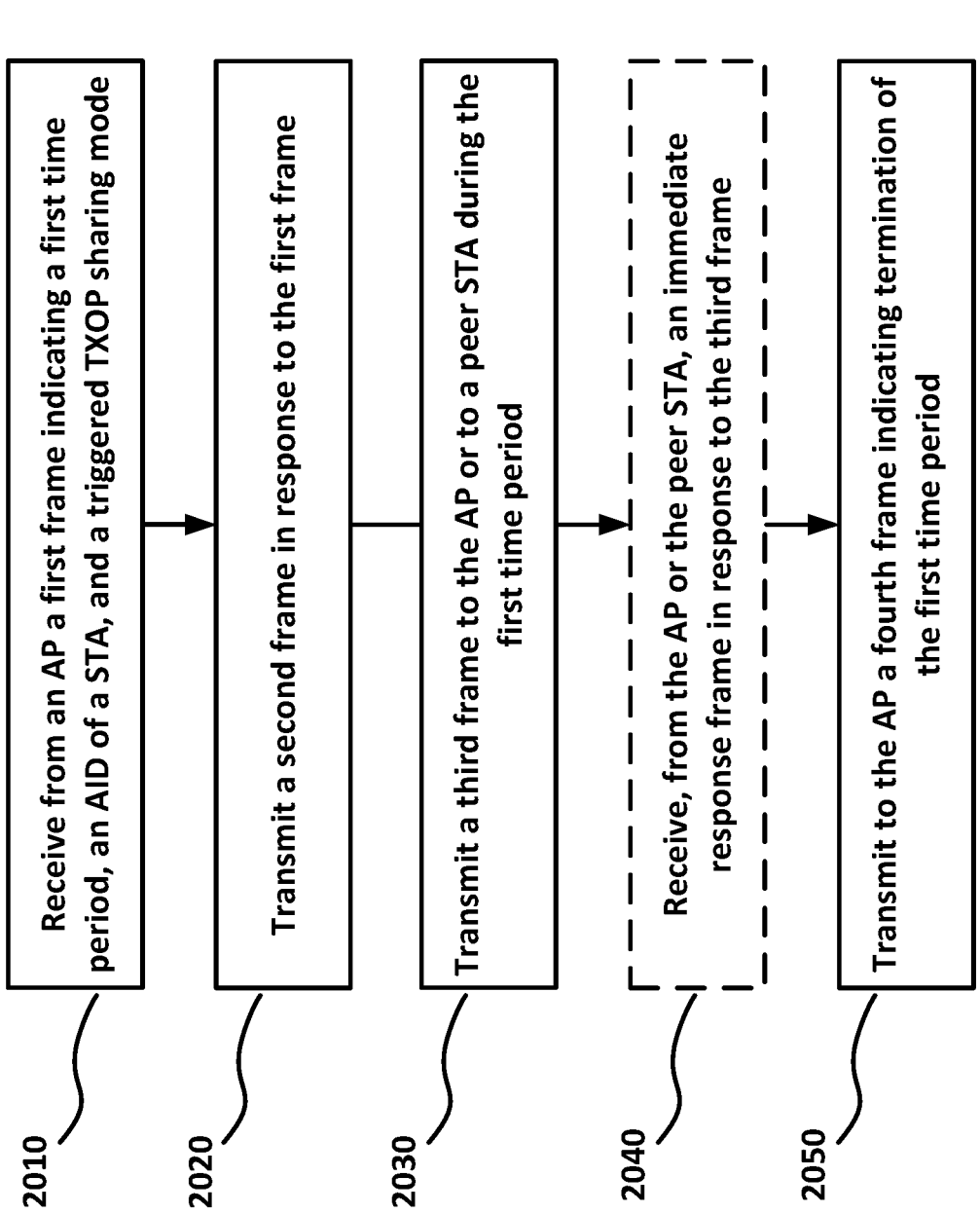

2010 — Receive from an AP a first frame indicating a first time period, an AID of a STA, and a triggered TXOP sharing mode 2020 — Transmit a second frame in response to the first frame 2030 — Transmit a third frame to the AP or to a peer STA during the first time period 2040 — Receive, from the AP or the peer STA, an immediate response frame in response to the third frame 2050 — Transmit to the AP a fourth frame indicating termination of the first time period

FIG. 20

TRIGGERED TXOP SHARING (TXS) TIME TERMINATION

CROSS-REFERENCE TO RELATED APPLICATIONS

This application claims the benefit of U.S. Provisional Application No. 63/309,675, filed Feb. 14, 2022, which is hereby incorporated by reference in its entirety.

BRIEF DESCRIPTION OF THE DRAWINGS

Examples of several of the various embodiments of the present disclosure are described herein with reference to the drawings.

FIG. 5 illustrates an example TWT element which may be used to support individual TWT operation.

FIG. 19 illustrates an example process 1900 which may be used in a TXS time termination procedure.

FIG. 20 illustrates an example process 2000 which may be used in a TXS time termination procedure.

DETAILED DESCRIPTION

Figure 1:
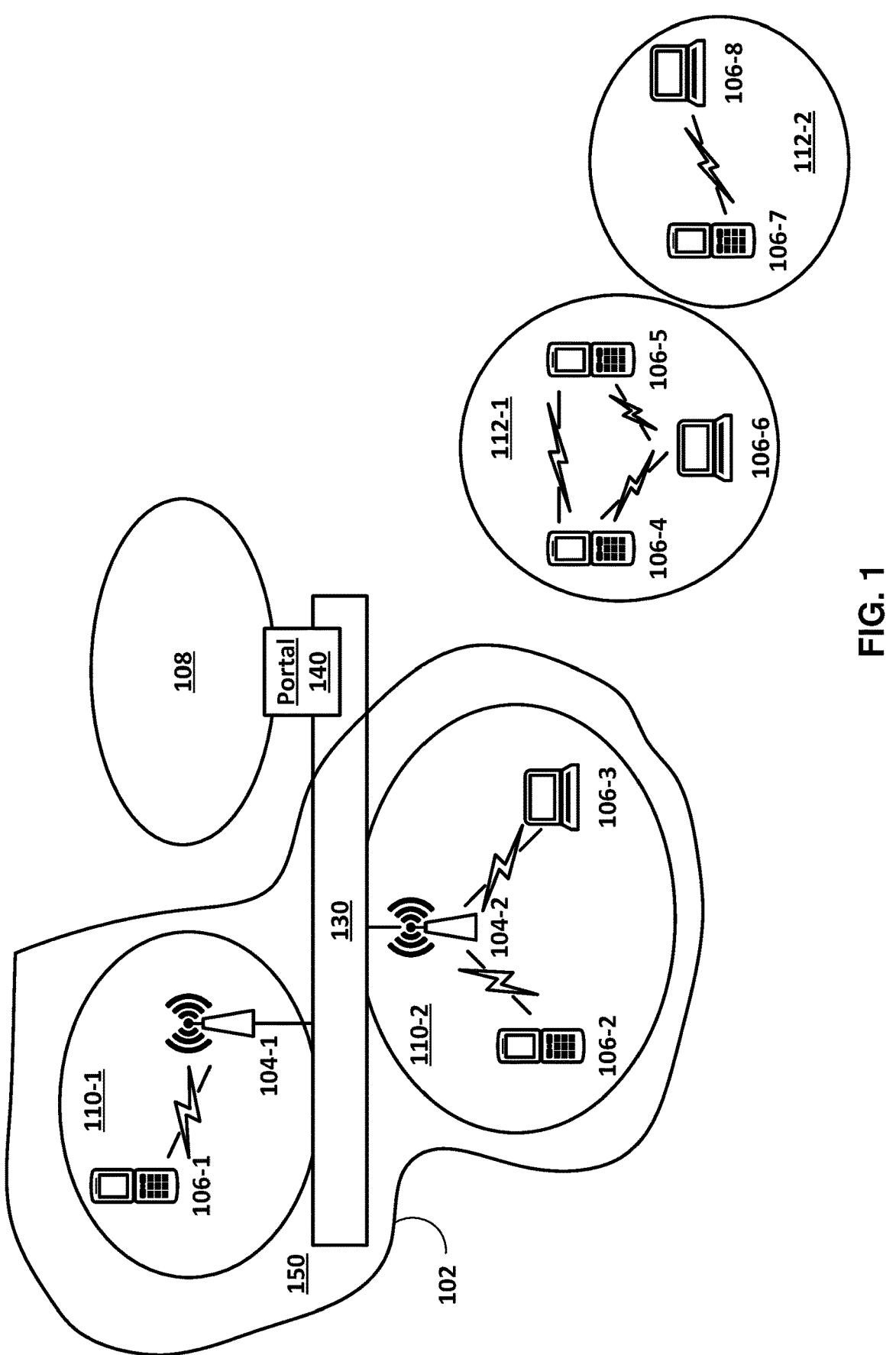
FIG. 1 illustrates example wireless communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. After reading the description, it will be apparent to one skilled in the relevant art how to implement alternative embodiments. The present embodiments may not be limited by any of the described example embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a station, an access point, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, may be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={STA1, STA2} are: {STA1}, {STA2}, and {STA1, STA2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages/frames comprise a plurality of parameters, it implies that a parameter in the plurality of parameters is in at least one of the one or more messages/frames but does not have to be in each of the one or more messages/frames.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1 illustrates example wireless communication networks in which embodiments of the present disclosure may be implemented.

As shown in FIG. 1, the example wireless communication networks may include an Institute of Electrical and Electronic Engineers (IEEE) 802.11 (WLAN) infra-structure network 102. WLAN infra-structure network 102 may include one or more basic service sets (BSSs) 110 and 120 and a distribution system (DS) 130.

BSS 110-1 and 110-2 each includes a set of an access point (AP or AP STA) and at least one station (STA or non-AP STA). For example, BSS 110-1 includes an AP 104-1 and a STA 106-1, and BSS 110-2 includes an AP 104-2 and STAs 106-2 and 106-3. The AP and the at least one STA in a BSS perform an association procedure to communicate with each other.

DS 130 may be configured to connect BSS 110-1 and BSS 110-2. As such, DS 130 may enable an extended service set (ESS) 150. Within ESS 150, APs 104-1 and 104-2 are connected via DS 130 and may have the same service set identification (SSID).

WLAN infra-structure network 102 may be coupled to one or more external networks. For example, as shown in FIG. 1, WLAN infra-structure network 102 may be connected to another network 108 (e.g., 802.X) via a portal 140. Portal 140 may function as a bridge connecting DS 130 of WLAN infra-structure network 102 with the other network 108.

The example wireless communication networks illustrated in FIG. 1 may further include one or more ad-hoc networks or independent BSSs (IBSSs). An ad-hoc network or IBSS is a network that includes a plurality of STAs that are within communication range of each other. The plurality of STAs are configured so that they may communicate with each other using direct peer-to-peer communication (i.e., not via an AP).

For example, in FIG. 1, STAs 106-4, 106-5, and 106-6 may be configured to form a first IBSS 112-1. Similarly, STAs 106-7 and 106-8 may be configured to form a second IBSS 112-2. Since an IBSS does not include an AP, it does not include a centralized management entity. Rather, STAs within an IBSS are managed in a distributed manner. STAs forming an IBSS may be fixed or mobile.

A STA as a predetermined functional medium may include a medium access control (MAC) layer that complies with an IEEE 802.11 standard. A physical layer interface for a radio medium may be used among the APs and the non-AP stations (STAs). The STA may also be referred to using various other terms, including mobile terminal, wireless device, wireless transmit/receive unit (WTRU), user equipment (UE), mobile station (MS), mobile subscriber unit, or user. For example, the term "user" may be used to denote a STA participating in uplink Multi-user Multiple Input, Multiple Output (MU MIMO) and/or uplink Orthogonal Frequency Division Multiple Access (OFDMA) transmission.

A physical layer (PHY) protocol data unit (PPDU) may be a composite structure that includes a PHY preamble and a payload in the form of a PHY service data unit (PSDU). For example, the PSDU may include a PHY preamble and header and/or one or more MAC protocol data units (MPDUs). The information provided in the PHY preamble may be used by a receiving device to decode the subsequent data in the PSDU. In instances in which PPDUs are transmitted over a bonded channel (channel formed through channel bonding), the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

A frequency band may include one or more sub-bands or frequency channels. For example, PPDUs conforming to the IEEE 802.11n, 802.11ac, 802.11ax and/or 802.11be standard amendments may be transmitted over the 2.4 GHz, 5 GHz, and/or 6 GHz bands, each of which may be divided into multiple 20 MHz channels. The PPDUs may be transmitted over a physical channel having a minimum bandwidth of 20 MHz. Larger channels may be formed through channel bonding. For example, PPDUs may be transmitted over physical channels having bandwidths of 40 MHz, 80 MHz, 160 MHz, or 320 MHz by bonding together multiple 20 MHz channels.

Figure 2:
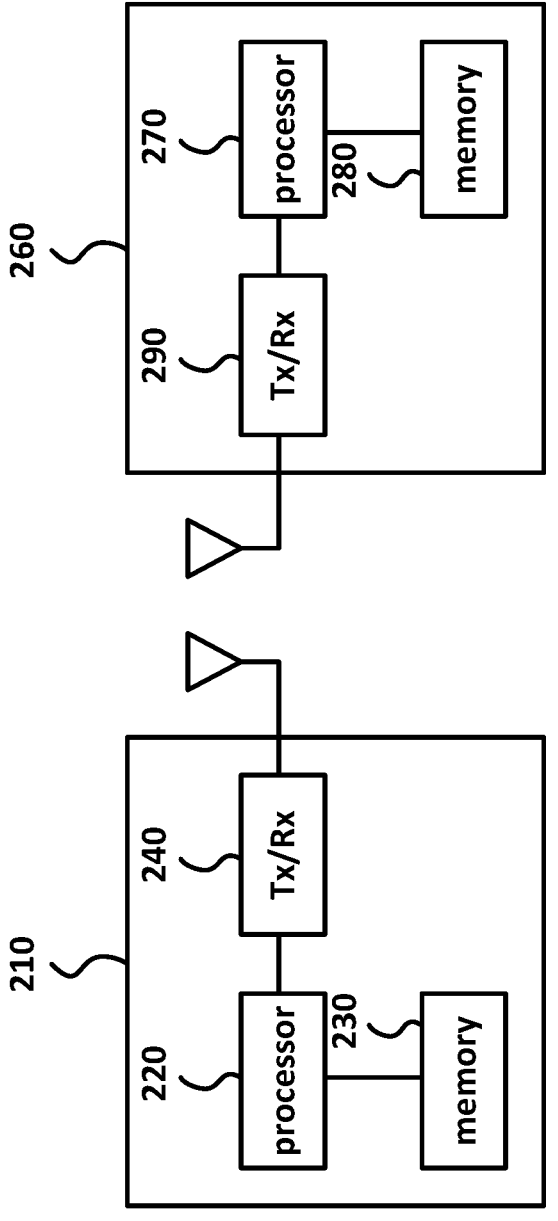
FIG. 2 is a block diagram illustrating example implementations of a station (STA) and an access point (AP).

FIG. 2 is a block diagram illustrating example implementations of a STA 210 and an AP 260.

As shown in FIG. 2, STA 210 may include at least one processor 220, a memory 230, and at least one transceiver 240. AP 260 may include at least one processor 270, memory 280, and at least one transceiver 290. Processor 220/270 may be operatively connected to transceiver 240/290.

Transceiver 240/290 may be configured to transmit/receive radio signals. In an embodiment, transceiver 240/290 may implement a PHY layer of the corresponding device (STA 210 or AP 260).

In an embodiment, STA 210 and/or AP 260 may be a multi-link device (MLD), that is a device capable of operating over multiple links as defined by the IEEE 802.11be standard amendment. As such, STA 210 and/or AP 260 may each have multiple PHY layers. The multiple PHY layers may be implemented using one or more of transceivers 240/290.

Processor 220/270 may implement functions of the PHY layer, the MAC layer, and/or the logical link control (LLC) layer of the corresponding device (STA 210 or AP 260).

Processor 220/270 and/or transceiver 240/290 may include application specific integrated circuit (ASIC), other chipset, logic circuit and/or data processor. Memory 230/280 may include read-only memory (ROM), random access memory (RAM), flash memory, memory card, storage medium and/or other storage unit.

When the embodiments are executed by software, the techniques (or methods) described herein can be executed with modules (e.g., processes, functions, and so on) that perform the functions described herein. The modules can be stored in memory 230/280 and executed by processor 220/270. Memory 230/280 may be implemented (or positioned) within processor 220/270 or external to processor 220/270. Memory 230/280 may be operatively connected to processor 220/270 via various means known in the art.

Target wake time (TWT), a feature introduced in the IEEE 802.11ah standard, allows STAs to manage activity in the BSS by scheduling STAs to operate at different times to reduce contention. TWTs may allow STAs to reduce the required amount of time that a STA utilizing a power management mode may be awake. TWTs may be individual TWTs or broadcast TWTs. Individual TWTs follow a negotiated TWT agreement between STAs. Broadcast TWTs are based on a schedule set and provided to STAs by an AP.

In an individual TWT, a STA that requests a TWT agreement is called a TWT requesting STA. The TWT requesting STA may be a non-AP STA for example. The STA that responds to the request is called a TWT responding STA. The TWT responding STA may be an AP for example. The TWT requesting STA is assigned specific times to wake up and exchange frames with the TWT responding STA. The TWT requesting STA may communicate wake scheduling information to the TWT responding STA. The TWT responding STA may transmit TWT values to the TWT requesting STA when a TWT agreement is established between them.

When explicit TWT is employed, the TWT requesting STA may wake up and perform a frame exchange. The TWT requesting STA may receive a next TWT information in a response from the TWT responding STA. When implicit TWT is used, the TWT requesting STA may calculate a next TWT by adding a fixed value to the current TWT value.

The TWT values for implicit TWT may be periodic. The TWT requesting STA operating with an implicit TWT agreement may determine a next TWT service period (TWT SP) start time by adding a value of a TWT wake interval associated with the TWT agreement to the value of the start time of the current TWT SP. The TWT responding STA may include the start time for a series of TWT SPs corresponding to a single TWT flow identifier of an implicit TWT agreement in a target wake time field of a TWT element. The TWT element may contain a value of 'accept TWT' in a TWT setup command field. The start time of the TWT SP series may indicate the start time of a first TWT SP in the series. Start times of subsequent TWT SPs may be determined by adding the value of the TWT wake interval to the start time of the current TWT SP. In an example, the TWT requesting STA, awake for an implicit TWT SP, may enter a doze state after the TWT SP has elapsed or after receiving an end of service period (EOSP) field equal to 1 from the TWT responding STA, whichever occurs first.

A TWT session may be negotiated between an AP and a STA. The TWT session may configure a TWT SP of DL and UL traffic between the AP and the STA. Expected traffic may be limited within the negotiated SP. The TWT SP may start at a specific time. The TWT SP may run for a SP duration. The TWT SP may repeat every SP interval.

Figure 3:
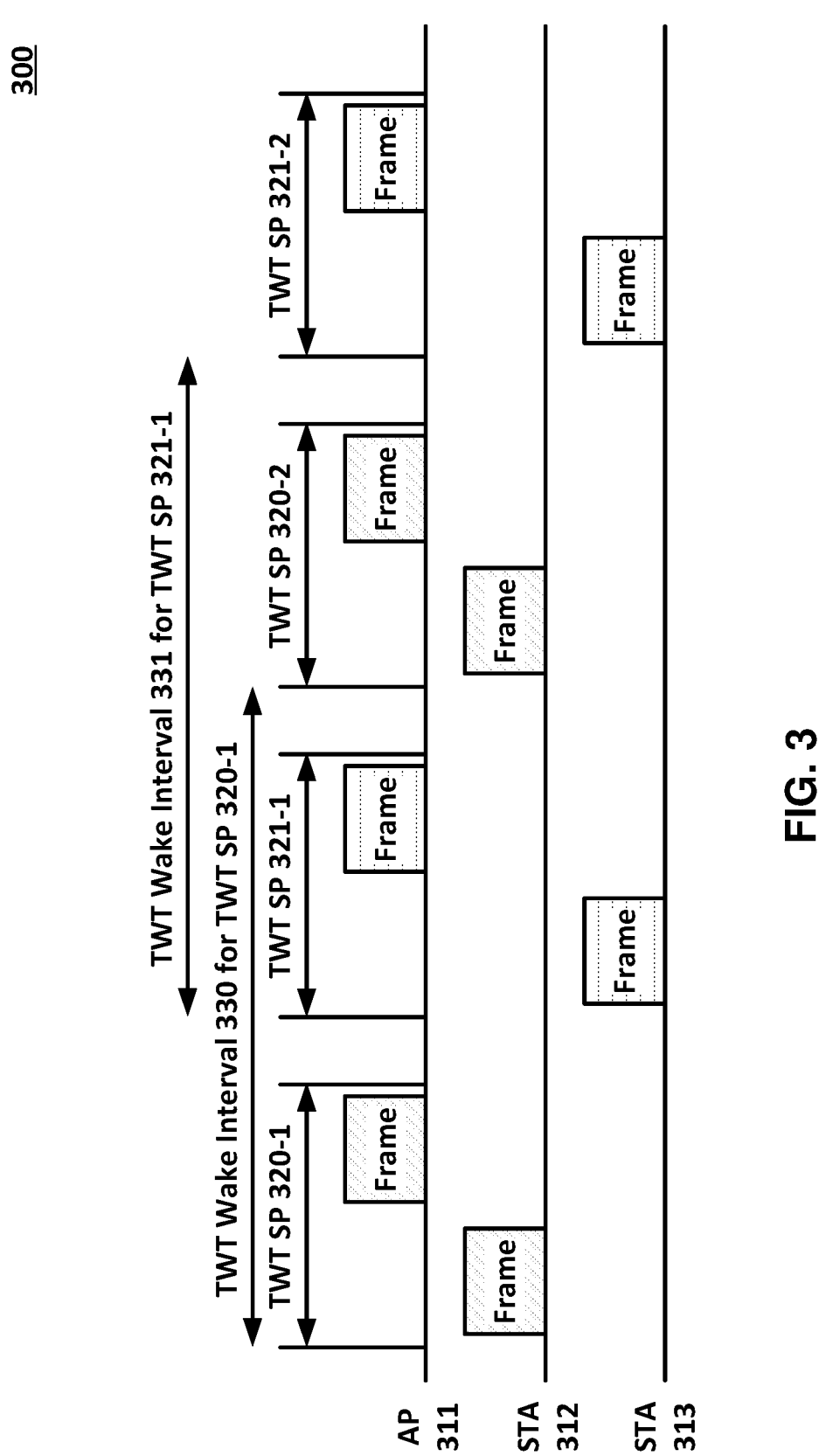
FIG. 3 illustrates an example of target wake time (TWT) operation.

FIG. 3 illustrates an example 300 of TWT operation. As shown in FIG. 3, example 300 includes an AP 311, a STA 312, and a STA 313. AP 311 and STA 312 may establish a TWT SP 320. AP 311 and STA 313 may establish a TWT SP 321. TWT SP 320 and TWT SP 321 may repeat as shown in FIG. 3, such that TWT SP 320 may include a first TWT SP 320-1 and a second TWT SP 320-2, and such that TWT SP 321 may include a first TWT SP 321-1 and a second TWT SP 321-2.

AP 311 and STA 312 may exchange frames during first TWT SP 320-1. STA 312 may enter a doze state at the end of TWT SP 320-1 and may remain in the doze state until the start of second TWT SP 320-2. The start of second TWT SP 320-2 may be indicated by a TWT wake interval 330 associated with TWT SP 320. AP 311 and STA 312 may again exchange frames during second TWT SP 320-2.

Similarly, AP 311 and STA 313 may exchange frames during first TWT SP 321-1. STA 313 may enter a doze state at the end of first TWT SP 321-1 and may remain in the doze state until the start of second TWT SP 321-2. The start of second TWT SP 321-2 may be indicated by a TWT wake interval 331 associated with TWT SP 321. AP 311 and STA 313 may again exchange frames during second TWT SP 31-2.

In an awake state, a STA may be fully powered. The STA may transmit and/or receive a frame to/from an AP or another STA. In a doze state, a STA may not transmit and may not receive a frame to/from an AP or another STA.

An MLD is an entity capable of managing communication over multiple links. The MLD may be a logical entity and may have more than one affiliated station (STA). The MLD may have a single MAC service access point (MAC-SAP) to the LLC layer, which includes a MAC data service. An MLD may be an access point MLD (AP MLD) when a STA affiliated with the MLD is an AP STA (or an AP). An MLD may be a non-access point MLD (non-AP MLD) or STA MLD when a STA affiliated with the MLD is a non-AP STA (or a STA).

During negotiation of TWT agreements, a TWT requesting STA affiliated with a STA MLD and a TWT responding STA affiliated with an AP MLD may communicate multiple TWT elements. The TWT elements may comprise link ID bitmap subfields indicating different link(s) in a TWT setup frame. The TWT parameters provided by a TWT element may be applied to the respective link that is indicated in the TWT element.

Figure 4:
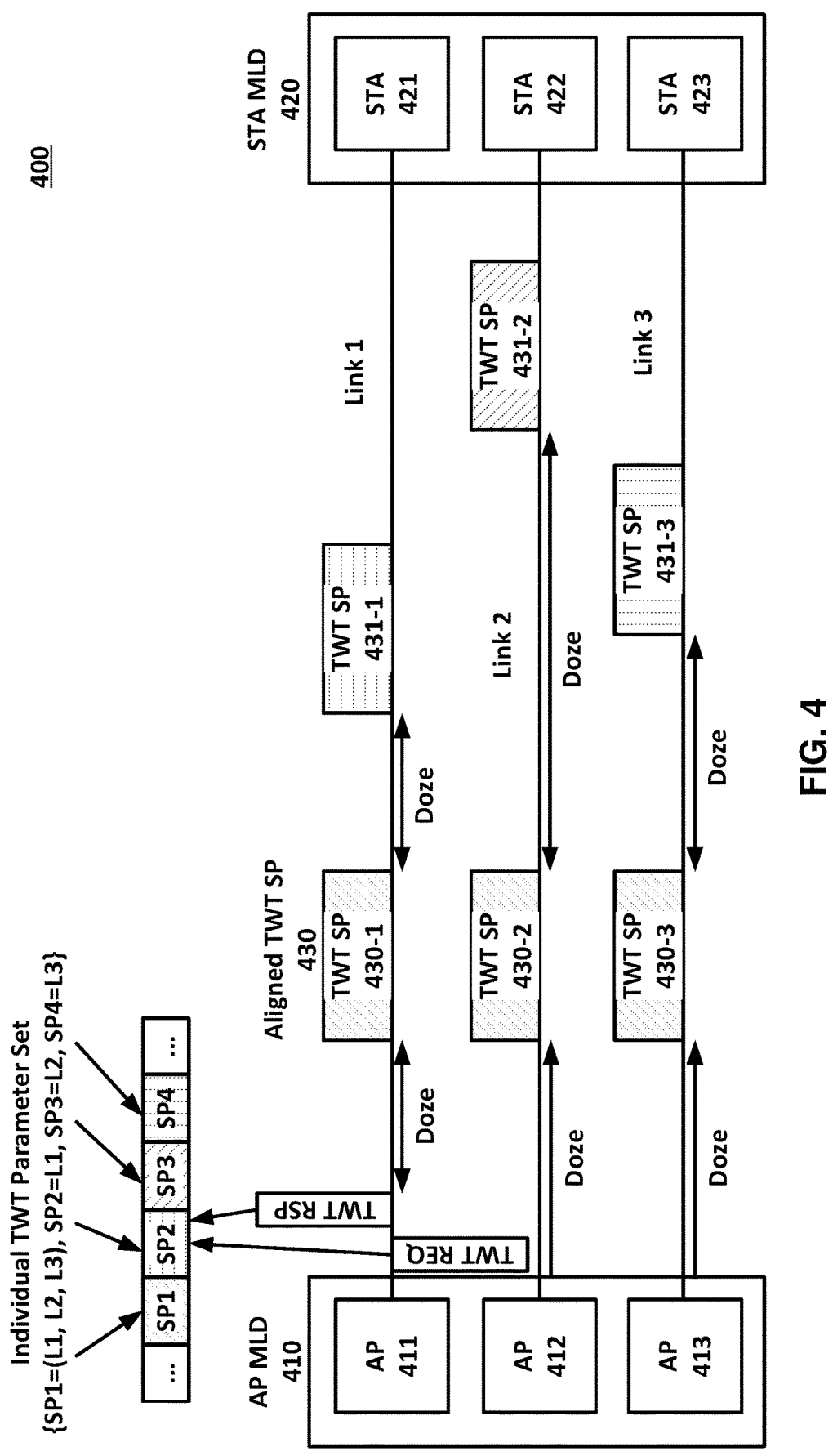
FIG. 4 illustrates an example of TWT operation in an environment including an AP multi-link device (AP MLD) and a station multi-link device (STA MLD).

FIG. 4 illustrates an example 400 of TWT operation in a multi-link environment including an AP multi-link device (AP MLD) 410 and a STA multi-link device (STA MLD) 420. As shown in FIG. 4, AP MLD 410 may have three affiliated APs, AP 411, AP2 412, and AP3 413. In an example, AP 411, AP2 412, and AP3 413 may operate respectively on the 2.4 GHz band, the 5 GHz band, and the 6 GHz band. STA MLD 420 may have three affiliated STAs, STA 421, STA 422, and STA 423. In an example, STA 421, STA 422, and STA 423 may operate respectively on the 2.4 GHz band, the 5 GHz band, and the 6 GHz band. In an example, AP 411, AP2 412, and AP3 413 may be communicatively coupled via a first link (link 1), a second link (link 2), and a third link (link 3) respectively with STA 421, STA 422, and STA 423, respectively.

In an example, STA 421 may transmit a TWT request to AP 411. The TWT request may include three TWT elements. Each TWT element may indicate a respective link of links 1-3 and may request the setup of a TWT agreement for the indicated link. The three TWT elements may have different TWT parameters, such as target wake time (TWT). In response to the TWT request, AP 411 may transmit a TWT response to STA 421. The TWT response may include three TWT elements. Each TWT element may indicate a respective link of links 1-3 and may include a value of 'accept TWT' in a TWT setup command field.

Successful TWT agreement setup on links 1-3 establishes three TWT SPs with same or different TWT parameters on links 1-3 respectively. The target wake time field of the TWT element indicating a given link indicates the start time of the TWP SP for that link. The starting time may be indicated in reference to a time synchronization function (TSF) time of the link.

In example 400, initial TWT SPs 430-1, 430-2, and 430-3 of links 1-3 respectively may be aligned. TWT wake intervals associated with the TWT agreements of links 1-3 respectively may be set differently. As such, second TWT SPs 431-1, 431-2, and 431-3 of links 1-3 respectively may not be aligned. STA 421, STA 422, and STA 423 may enter a doze state between the end of initial TWT SPs 430-1,

430-2, and 430-3, respectively, and the start of second TWT SPs 431-1, 431-2, 431-3, respectively.

Figure 5:
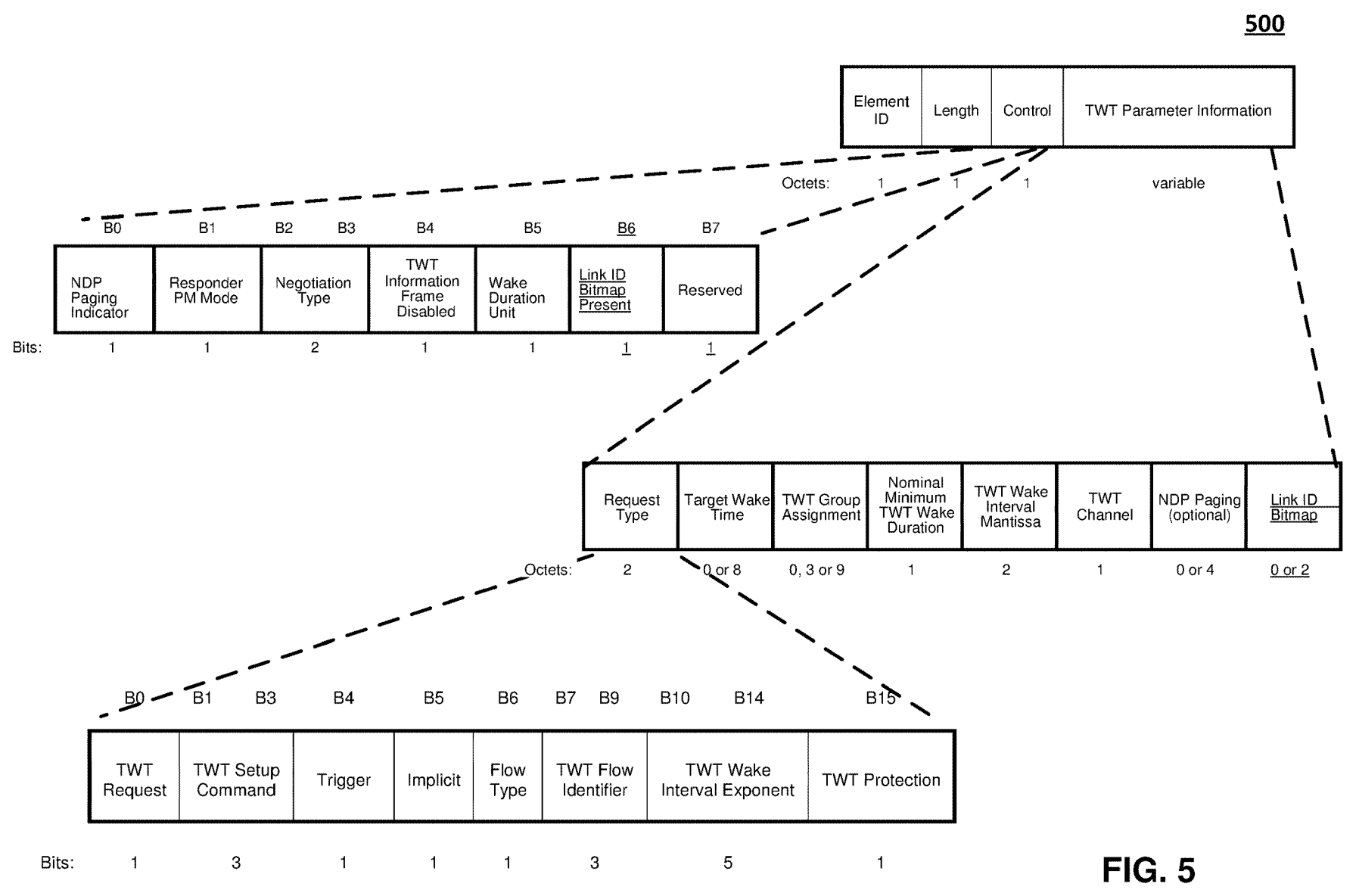

FIG. 5 illustrates an example target wake time (TWT) element 500 which may be used to support individual TWT operation.

In an example, an AP and a STA may use TWT element 500 to negotiate a TWT agreement. The AP and/or the STA may transmit TWT element 500 in an individually addressed management frame. The management frame may be of the type action, action no ack, (re)association request/response, and probe request response, for example.

The TWT schedule and parameters may be provided during a TWT setup phase. Renegotiation/changes of TWT schedules may be signaled via individually addressed frames that contain the updated TWT schedule/parameters. The frames may be management frames as described above or control or data frames that carry a field containing the updated TWT schedule/parameters.

Referring to FIG. 5, TWT element 500 includes an element ID field, a length field, a control field, and a TWT parameter information field.

The element ID field (e.g., 1 octet in length) may indicate that information element 500 is a TWT element. The length field (e.g., 1 octet) may indicate the length of TWT element 500 starting from the control field until an end of TWT element 500. The end of TWT element 500 may be the end of a TWT Channel field or the end of a Link ID bitmap field of the TWT parameter information field.

The TWT parameter information field may include a request type field (e.g., 2 octets), a target wake time field (e.g., 8 octets or less), a TWT group assignment field (e.g., 9, 3, 2, or 0 octets), a nominal minimal TWT wake duration field (e.g., 1 octet), a TWT wake interval mantissa (e.g., 2 octets), a TWT channel field (e.g., 1 octet), an optional NDP paging field (e.g., 0 or 4 octets), and/or a Link ID bitmaps field (e.g., 0 or 2 Octets).

The request type field may indicate a type of TWT request. The request type field may include a TWT request field (e.g., 1 bit), a TWT setup command field (e.g., 3 bits), a trigger field (e.g., 1 bit), an implicit field (e.g., 1 bit), a flow type (e.g., 1 bit), a TWT flow identifier (e.g., 3 bits), a TWT wake interval exponent (e.g., 5 bits), and/or a TWT protection field (e.g., 1 bit).

The TWT request field may indicate whether the TWT element 500 represents a request. If TWT request field has a value of 1, then the TWT element 500 may represent a request to initiate TWT scheduling/setup.

The TWT setup command field may indicate a type of TWT command. In a TWT request, the type of TWT command indicated may be: a request TWT (the TWT responding STA specifies the TWT value; e.g., field set to 0), a suggest TWT (the TWT requesting STA suggests a TWT value; e.g., field set to 1), and a demand TWT (the TWT requesting STA demands a TWT value; e.g., field set to 2).

In a TWT response, the type of TWT command indicated may be: TWT grouping (the TWT responding STA suggests TWT group parameters that are different than the suggested or demanded TWT parameters of the TWT requesting STA; e.g., field set to 3), accept TWT (the TWT responding STA accepts the TWT request with the TWT parameters indicated by the TWT requesting STA; e.g. field set to 4), alternate TWT (the TWT responding STA suggests TWT parameters that are different than the parameters suggested or demanded by the TWT requesting STA; e.g., field set to 5), dictate TWT (the TWT responding STA demands TWT parameters that are different than the parameters suggested or demanded by the TWT requesting STA; e.g., field set to 6), or reject TWT (the TWT responding STA rejects the TWT setup; e.g. field set to 7).

In a TWT response, the TWT command may also indicate an unsolicited response or a broadcast TWT. An unsolicited TWT response is an individually addressed frame that is intended for a specific STA. An unsolicited TWT response may be followed by an ACK frame from the STA receiving the unsolicited TWT response. A broadcast TWT may be intended for multiple STAs and may be carried in a broadcast frame such as, for example, a beacon frame. A broadcast TWT may not be acknowledged by receiving STAs.

An unsolicited TWT response may be used a TWT responding STA to demand that a recipient follow a TWT schedule contained in the TWT element. In an embodiment, an unsolicited TWT response may have the TWT request field set to 0 and a value of 'dictate TWT' in the TWT setup command field. A broadcast TWT response may be used by a TWT responding STA to schedule a TWT for any STA that receives and decodes the TWT element.

In certain embodiments, a TWT element, such as TWT element 500, may contain TWT parameter sets for multiple TWT negotiations or indications as described herein. As such, the TWT element may include multiple instances of the Control and the TWT parameter information fields. The TWT flow identifier of the request type field indicates the TWT negotiation which parameters are carried by the TWT parameter information field.

Figure 6:
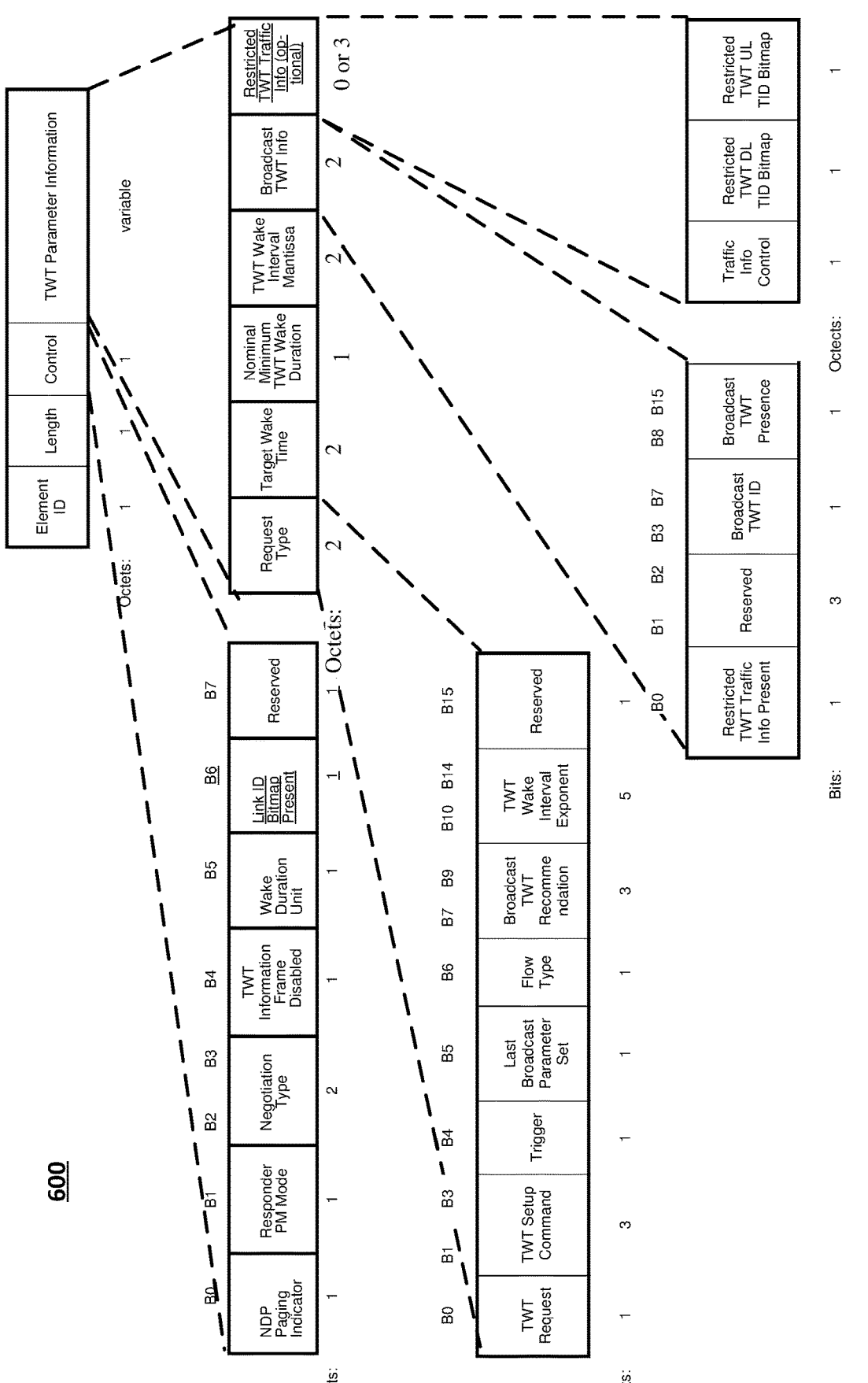
FIG. 6 illustrates an example TWT element which may be used to support restricted TWT (r-TWT) operation.

FIG. 6 illustrates an example target wake time (TWT) element 600 which may be used to support restricted TWT (r-TWT) operation. For r-TWT, TWT element 600 may be transmitted in a broadcast management frame, which can be a beacon frame, a TIM broadcast frame, a probe response frame, etc. In this embodiment, TWT element 600 provides non-negotiated TWT schedules (e.g., broadcast TWT schedules).

As shown, TWT element 600 includes an element ID field, a length field, a control field, and a TWT parameter information field.

The element ID field (e.g., 1 octet in length) may indicate that information element 600 is a TWT element. The length field (e.g., 1 octet) may indicate the length of TWT element 600 starting from the control field until an end of TWT element 600. The end of TWT element 600 may be the end of a broadcast TWT info field or the end of a r-TWT traffic info field of the TWT parameter information field.

The TWT parameter information field may include a request type field, a target wake time field (e.g., 2 octets), a nominal minimal TWT wake duration field (e.g., 1 octet), a TWT wake interval mantissa (e.g., 2 octets), a broadcast TWT info field (e.g., 2 octets), and an optional r-TWT traffic info field (e.g., 0 or 3 octets).

The request type field may include, among other fields, a TWT request field, a flow type field, and a TWT wake interval exponent field.

The TWT request field indicates whether TWT element 600 is a request. If the TWT request field has a value of 0, then TWT element 600 may represent a response to a request to initiate TWT scheduling/setup (solicit TWT), an unsolicited TWT response, and/or a broadcast TWT message.

The TWT wake interval represents the average time that a TWT requesting STA or a TWT scheduled STA expects to elapse between successive TWT SP start times of a TWT schedule. The TWT wake interval exponent field indicates a (base 2) exponent used to calculate the TWT wake interval in microseconds. In an embodiment, the TWT wake interval is equal to: (TWT wake interval mantissa)$\times 2^{(TWT\ Wake\ Interval}$ $_{Exponent)}$. The TWT wake interval mantissa value is indicated in microseconds, base 2 in a TWT wake interval mantissa field of the TWT parameter information field.

The nominal minimum TWT wake duration field may indicate the minimum amount of time (in the unit indicated by a wake duration unit subfield of the control field) that a TWT requesting STA or a TWT scheduled STA is expected to be awake to complete frame exchanges for the period of the TWT wake interval.

The flow type field, in a TWT response that successfully set up a TWT agreement between a TWT requesting STA and a TWT responding STA, may indicate a type of interaction between the TWT requesting STA and the TWT responding STA within a TWT SP of the TWT agreement. A flow type field equal to 0 may indicate an announced TWT. In an announced TWT, the TWT responding STA may not transmit a frame to the TWT requesting STA within a TWT SP until the TWT responding STA receives a PS-Poll frame or a Quality of Service (QoS) Null frame from the TWT requesting STA. A flow type field equal to 1 may indicate an unannounced TWT. In an unannounced TWT, the TWT responding STA may transmit a frame to the TWT requesting STA within a TWT SP before it has received a frame from the TWT requesting STA.

Within a TWT element that includes a TWT setup command value of 'request TWT', 'suggest TWT', or 'demand TWT', a broadcast TWT ID may indicate a specific broadcast TWT in which the TWT requesting STA is requesting to participate. Within a TWT element that includes a TWT setup command value of 'accept TWT', 'alternate TWT', 'dictate TWT', or 'reject TWT', a broadcast TWT ID may indicate a specific broadcast TWT for which the TWT responding STA is providing TWT parameters. The value 0 in the broadcast TWT ID subfield may indicate the broadcast TWT whose membership corresponds to all STAs that are members of the BSS corresponding to the BSSID of the management frame carrying the TWT element and that is permitted to contain trigger frames with random access resource units for unassociated STAs. The Broadcast TWT ID subfield in a r-TWT Parameter set field is always set to a nonzero value.

A broadcast TWT element 600 that contains a r-TWT parameter set is also referred to as a r-TWT element. A r-TWT traffic info present subfield of the broadcast TWT info field may be set to 1 to indicate the presence of the r-TWT traffic info field in TWT element 600. The r-TWT traffic info field is present in a r-TWT parameter set field when the r-TWT traffic info present subfield is set to 1.

The r-TWT traffic info field may include a traffic info control field, a r-TWT DL TID bitmap field, and a r-TWT UL TID bitmap field.

The traffic info control field may include a DL TID bitmap valid subfield and an UL TID bitmap valid subfield. The DL TID bitmap valid subfield indicates if the r-TWT DL TID bitmap field has valid information. When the value of the DL TID bitmap valid subfield is set to 0, it may indicate that DL traffic of TIDs is identified as latency sensitive traffic, and the r-TWT DL TID bitmap field is reserved. The UL TID bitmap valid subfield may indicate if the r-TWT UL TID bitmap field has valid information. When the value of the UL TID bitmap valid subfield is set to 0, it may indicate that UL traffic of TIDs is identified as latency sensitive traffic, and the r-TWT UL TID bitmap field is reserved.

The r-TWT DL TID bitmap subfield and the r-TWT UL TID bitmap subfield may specify which TID(s) are identified by the TWT scheduling AP or the TWT scheduled STA as latency sensitive traffic streams in a downlink and a uplink direction, respectively. A value of 1 at bit position k in the bitmap indicates that TID k is classified as a latency sensitive traffic stream. A value of 0 at bit position k in the bitmap indicates that TID k is not classified as a latency sensitive traffic stream.

An individual target wake time (TWT) may be a specific time or set of times negotiated between two individual stations (e.g., a STA and another STA, or a STA and an AP, etc.) at which the stations may be awake to exchange frames during a service period (SP) of the TWT.

In trigger-enabled TWT, an AP may transmit a trigger frame for scheduling uplink multi-user transmissions from one or more STAs using uplink OFDMA (orthogonal frequency division multiple access) and/or uplink MU-MIMO (multi-user multiple input multiple output) during a trigger-enabled TWT SP. A TWT STA that receives the trigger frame from the AP may transmit a frame to the AP through a resource indicated in the trigger frame during the trigger-enabled TWT SP.

In non-trigger-enabled TWT, an AP may not be required to transmit a trigger frame to schedule uplink multi-user transmissions from one or more STAs during a non-trigger-enabled TWT SP.

In announced TWT, a STA may transmit a frame (e.g., a PS-Poll frame or a QoS null frame) to the AP to retrieve a downlink buffered data from the AP during a TWT SP. In unannounced TWT, an AP may transmit downlink data to a TWT STA without receiving a frame (e.g., a PS-Poll frame, or a QoS null frame) from the TWT STA during a TWT SP.

Figure 7:
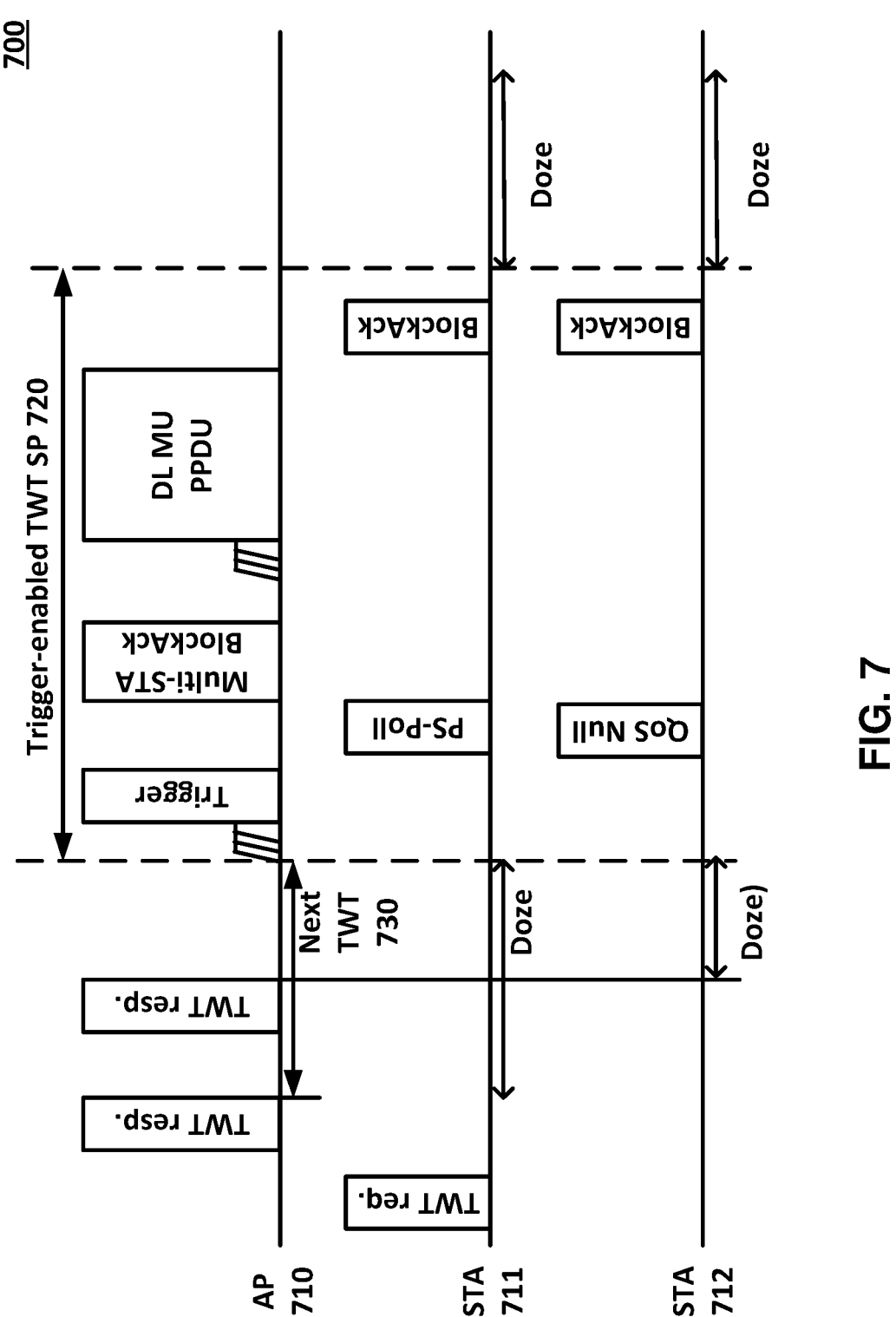
FIG. 7 illustrates an example of individual TWT operation.

FIG. 7 illustrates an example 700 of individual TWT operation. As shown in FIG. 7, example 700 includes an AP 710, a STA 711, and a STA 712. In an example, AP 710 may be a TWT responding STA and STA 711 and STA 712 may be TWT requesting STAs.

In an example, STA 711 may transmit a TWT request to AP 710 to setup a first trigger-enabled TWT agreement. STA 711 may set a trigger field of the TWT request to 1 to indicate that it is requesting a trigger-enabled TWT. AP 710 may accept the first TWT agreement with STA 711. AP 710 may confirm the acceptance in a TWT response sent to STA 711. The TWT response may indicate a next TWT 730, which indicates the time until a next TWT SP 720 according to the first TWT agreement.

In an example, AP 710 may transmit an unsolicited TWT response to STA 712 to set up a second trigger-enabled TWT agreement with STA 712 without receiving a TWT request from STA 712. The first and second TWT agreements may be set up as announced TWTs.

After the setup of the TWT agreements, STA 711 and STA 712 may enter a doze state until the start of TWT SP 720. During trigger-enabled TWT SP 720, AP 710 may transmit a trigger frame. STA 711 and STA 12 may respond to the trigger frame by indicating that they are in awake state. In an example, STA 711 may transmit a power save poll (PS-Poll) frame. The PS-Poll frame may comprise a BSSID (receiver address: RA) field set to an address of AP 710 and a transmitter address (TA) field set to an address of STA 711. In an example, STA 712 may transmit a QoS null frame in response to the trigger frame. The QoS null frame may comprise a MAC header (e.g., a frame control field, a duration field, address fields, a sequence control field, QoS control field) without a frame body.

In response to the PS-Poll frame and the QoS null frame, AP 710 may transmit a multi-STA Block Ack (M-BA) frame. The M-BA frame may include acknowledgement information associated with the PS-Poll frame and the QoS null frame received from STAs 711 and 712 respectively.

Subsequently, STA 711 and STA 712 may receive downlink bufferable units (DL BUs) from AP 710. The DL BUs may include a medium access control (MAC) service data unit (MSDU), an aggregate MAC service data unit (A-MSDU), and/or a bufferable MAC management protocol data unit (MMPDU). STA 711 and STA 712 may transmit Block Ack (BA) frames in response to the DL BUs. At the end of the TWT SP 720, STA 711 and STA 712 may return to a doze state.

A STA may execute individual TWT setup exchanges. The STA may not transmit frames to an AP outside of negotiated TWT SPs. The STA may not transmit frames that are not contained within high efficiency trigger-based physical protocol data units (HE TB PPDUs) to the AP within trigger-enabled TWT SPs. A HE TB PPDU may be transmitted by a STA based on receiving a trigger frame triggering uplink multi-user transmissions.

The AP of a trigger-enabled TWT agreement may schedule for transmission a trigger frame for a STA within the trigger-enabled TWT SP. The STA may transmit an HE TB PPDU as a response to the trigger frame sent during the trigger-enabled TWT SP. A STA that is in power save (PS) mode may include a PS-Poll frame or a QoS null frame in the HE TB PPDU if the TWT is an announced TWT, to indicate to the AP that the STA is currently in the awake state. The AP that receives the PS-Poll frame or the QoS Null frame or any other indication from an STA in PS mode, may deliver to the STA as many buffered BUs as are available at the AP during the TWT SP.

A broadcast target wake time (TWT) may be a specific time or set of times broadcast by an AP to one or more STAs at which the STAs may be awake to exchange frames with the AP during a SP of the TWT.

Figure 8:
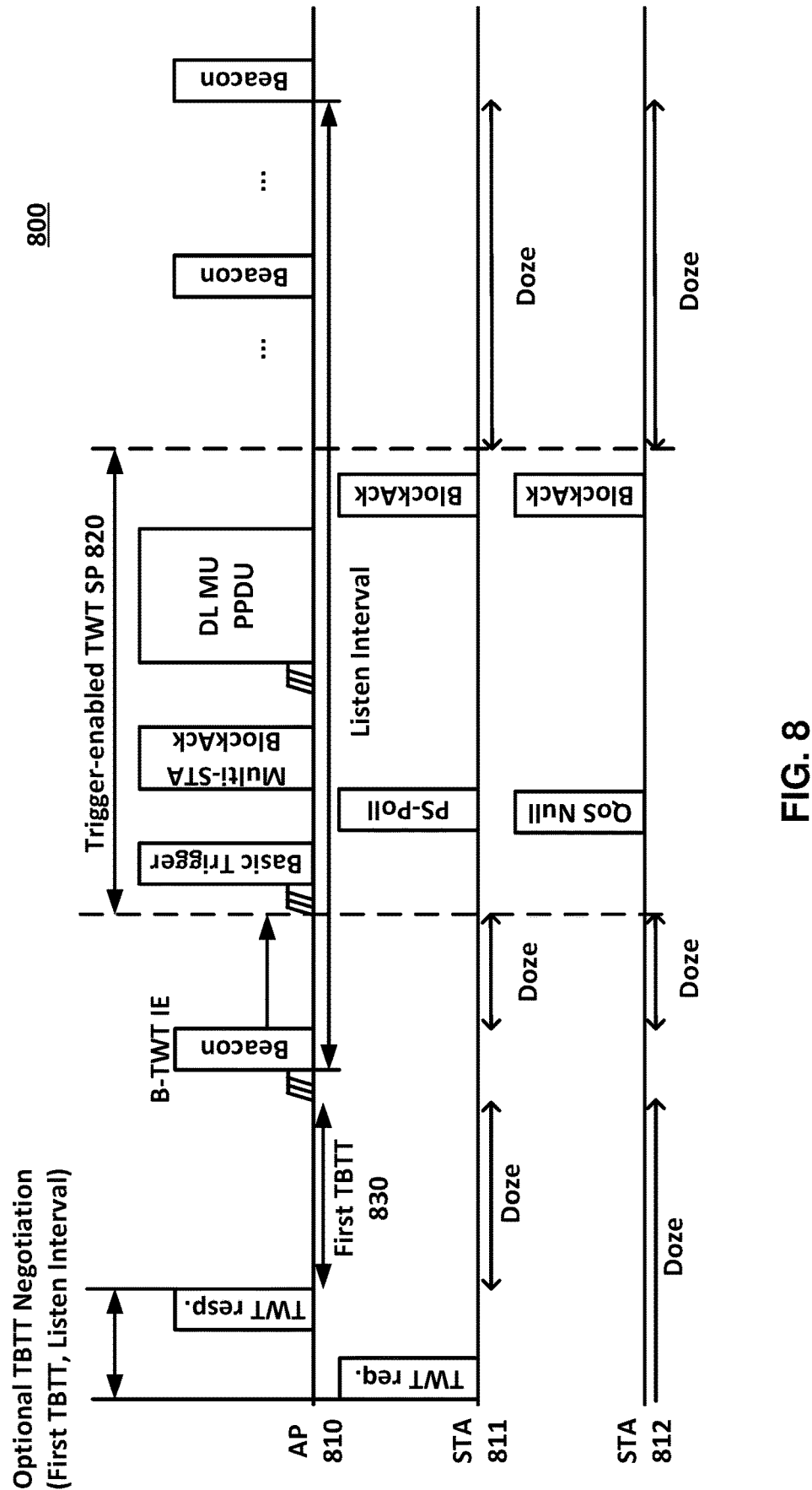
FIG. 8 illustrates an example of broadcast TWT operation.

FIG. 8 illustrates an example 800 of broadcast TWT operation. As shown in FIG. 8, example 800 includes an AP 810, a STA 811, and a STA 812. In an example 800, AP 810 may be a TWT scheduling AP and STA 811 and STA 812 may be TWT scheduled STAs.

In an example, AP 810 may include a broadcast TWT element in a beacon frame that indicates a broadcast TWT SP 820. During the broadcast TWT SP 820, AP 810 may transmit trigger frames or DL BUs to STA 811 and STA 812. Beacon frames may be sent by AP 810 at a regular interval defined as the target beacon transmission time (TBTT). The TBTT is a time interval measured in time units (TUs). A TU is equal to 1024 microseconds.

In an example, STA 811 and STA 812 may enter a doze state until the first target beacon transmission time (TBTT). STA 811 and STA 812 may wake up to receive the beacon frame at the first TBTT to determine the broadcast TWT. Upon reception of a broadcast TWT element in a beacon frame, STA 811 and STA 812 may re-enter the doze state until the start of trigger-enabled TWT SP 820.

During trigger-enabled TWT SP 820, AP 810 may transmit a basic trigger frame to STA 811 and STA 812. STA 811 may indicate that it is awake by transmitting a PS-Poll, and STA 812 may indicate that it is awake by transmitting a QoS null frame in response to the basic trigger frame. Subsequently, STA 811 and STA 812 may receive DL BUs from AP 810. STA 811 and STA 812 may return to the doze state outside of the TWT SP 720.

In an example, a STA that intends to operate in power save mode may negotiate a wake TBTT and a wake interval with the AP. For example, as shown in FIG. 8, STA 811 may transmit a TWT request to AP 810 that identifies a wake TBTT of the first beacon frame and a wake interval between subsequent beacon frames. AP 810 may respond with a TWT response to the TWT request confirming the wake TBTT and wake interval. After successfully completing the negotiation, STA 811 may enter a doze state until a first negotiated wake TBTT 830. STA 811 may be in an awake state to listen to the beacon frame transmitted at first negotiated wake TBTT 830. If STA 811 receives a beacon frame from AP 810 at or after TBTT 830, STA 811 may return to the doze state until the next wake TBTT unless a traffic indication map (TIM) element in a beacon frame includes a positive indication for STA 811. STA 811 may return to the doze state after a nominal minimum TBTT wake duration time has elapsed from the TBTT start time.

A Network Allocation Vector (NAV) is an indicator, maintained by a STA, of time periods when transmission onto the wireless medium (WM) may not be initiated by the STA regardless of whether the clear channel assessment (CCA) function of the STA senses that the WM is busy. A STA that receives at least one valid frame in a PSDU may update its NAV with the information from any valid duration field in the PSDU. The STA may update the NAV when a value of the received duration field is greater than the current NAV value of the STA.

A TWT protection is a mechanism employed to protect a TWT session from external STA transmissions. During a TWT SP configured to protect the TWT session, a STA that initiates a transmission opportunity (TXOP) to transmit a frame may transmit a request-to-send (RTS) frame or a clear-to-send (CTS) frame to protect the TWT session by setting the NAV of other STAs based on receiving of the RTS frame and/or the CTS frame. The RTS frame may comprise a frame control field, a duration field, a receiver address (RA) field, a transmitter address (TA) field, and a frame check sequence (FCS) field. The CTS frame may comprise a frame control field, a duration field, a receiver address (RA) field, and a frame check sequence (FCS) field.

The TWT protection field in a TWT element may indicate whether a TWT is protected or unprotected. A TWT requesting STA may set the TWT protection field to 1 to request the TWT responding STA to provide protection for the set of TWT SPs. A TWT protection field equal to 1 may indicate to use a NAV protection mechanism to protect access to the medium during the corresponding TWT SPs.

Figure 9:
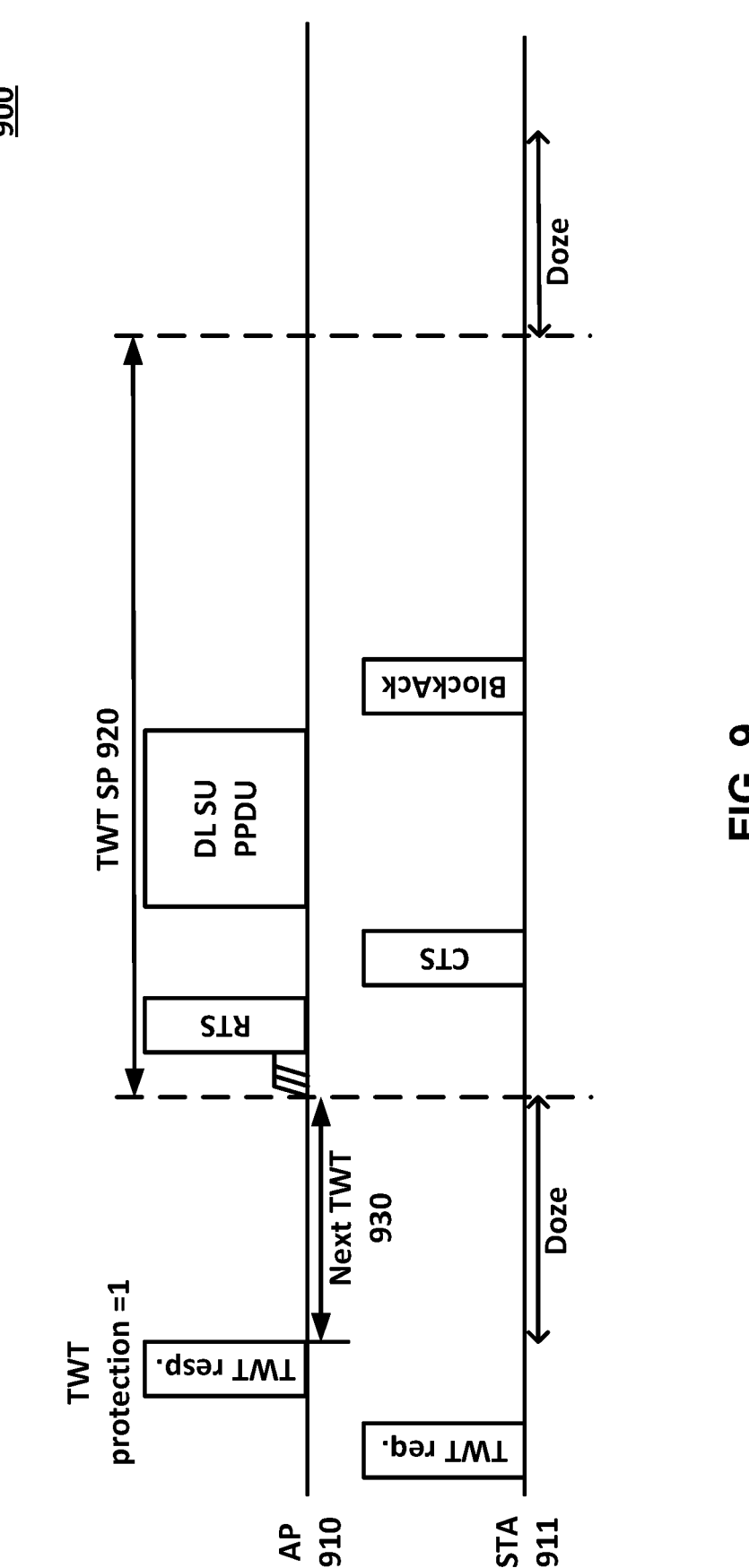
FIG. 9 illustrates an example of TWT protection in individual TWT operation.

FIG. 9 illustrates an example 900 of TWT protection in individual TWT operation. As shown in FIG. 9, example 900 includes an AP 910 and a STA 911.

In an example, AP 910 may set the TWT protection field to 1 in a TWT response frame to protect the TWT SPs using a NAV protection mechanism. Upon reception of the TWT response frame, STA 911 may enter a doze state until the next TWT 930. AP 910 that has set the TWT protection field to 1 may transmit a NAV setting frame at the start of the TWT SP 920. For example, the NAV setting frame may be an RTS frame or a CTS frame.

A STA that receives the NV setting frame and that is not scheduled to access the medium during the TWT SP 920 may set their NAV according to the NAV setting frame. The STA may not access the medium for the specified amount of time in the NAV setting frame.

STA 911 may be scheduled to access the medium during the TWT SP 920. STA 911 may respond to the RTS frame with a CTS frame. Upon receiving the CTS frame, AP 910 may transmit a downlink frame to STA 911. STA 911 may respond to the downlink frame with a BA frame. When the TWT SP 920 ends, STA 911 may return to the doze state.

In the next Wi-Fi standard, a triggered TXOP sharing procedure may allow an AP to allocate a portion of the time within an obtained TXOP to a STA for transmitting one or more non-trigger-based (non-TB) PPDUs. For the triggered TXOP sharing procedure, the AP may transmit a multi-user request-to-send (MU-RTS) TXOP sharing (TXS) trigger (MRTT) frame with a triggered TXOP sharing mode subfield set to a non-zero value. The MRTT frame is a trigger frame for triggering CTS frame(s) from multiple users.

In an example, during the portion of the allocated time, the STA may transmit the one or more non-TB PPDUs to the AP. In this case, the triggered TXOP sharing mode subfield in the MRTT frame may be set to 1.

In an example, during the portion of the allocated time, the STA may transmit the one or more non-TB PPDUs to the AP or a peer STA. In an example, the peer STA may be a STA that may have a connection for a P2P communication or a direct communication with the STA. In this case, the triggered TXOP sharing mode subfield in the MRTT frame may be set to 2.

Figure 10:
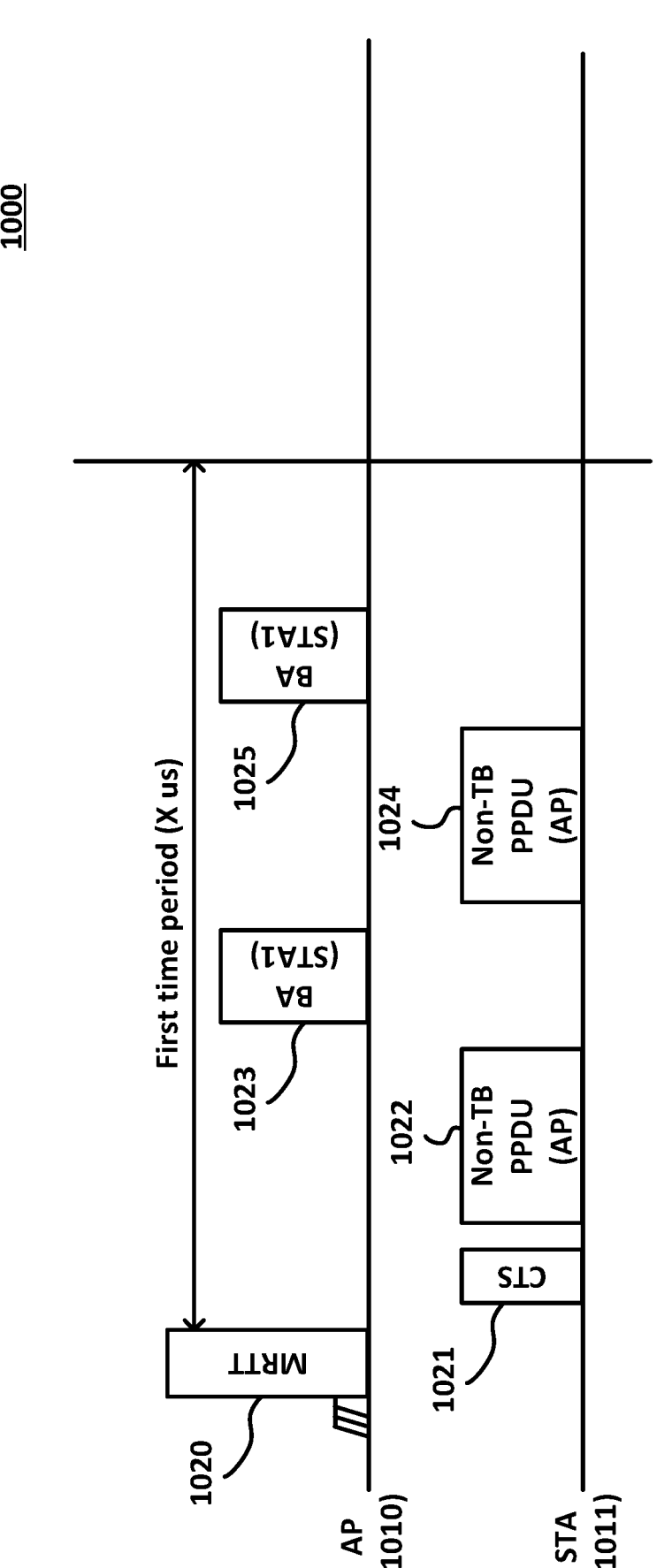
FIG. 10 illustrates an example of a triggered transmission opportunity (TXOP) sharing (TXS) procedure (Mode=1).

FIG. 10 illustrates an example 1000 of a TXS procedure (Mode=1). As shown in FIG. 10, the procedure may begin by an AP 1010 transmitting an MU-RTS TXS trigger (MRTT) frame 1020 to a STA 1011. MRTT frame 1020 may allocate a portion of an obtained TXOP to STA 1011 and may indicate a triggered TXOP sharing mode equal to 1. STA 1011 receiving MRTT 1020 may use the allocated time duration to transmit one or more non-TB PPDUs 1022, 1024 to AP 1010.

In an example, MRTT frame 1020 may comprise a triggered TXOP sharing mode subfield and/or a first time period.

In an example, the first time period may indicate a portion of a time allocated by AP 1010 within an obtained TXOP. In an example, the first time period may be indicated by a subfield in MRTT frame 1020. In an example, the first time period may be set to a value of X microseconds (us).

In an example, the triggered TXOP sharing mode subfield may be set to 1. The triggered TXOP sharing mode subfield set to 1 may indicate that STA 1011 may transmit one or more non-TB PPDUs to AP 1010 during the first time period. The one or more non-TB PPDUs may comprise a data frame, a control frame, a management frame, or an action frame.

For example, as shown in FIG. 10, MRTT frame 1020 may define a first time period of X us. STA 1011 may transmit non-TB PPDUs 1022, 1024 comprising one or more data frame to AP 1010 during the first time period, preceded by a CTS frame 1021. In an example, AP 1010 may transmit one or more BA frames 1023, 1025 in response to the one or more data frames contained in non-TB PPDUs 1022, 1024 received from STA 1011.

Figure 11:
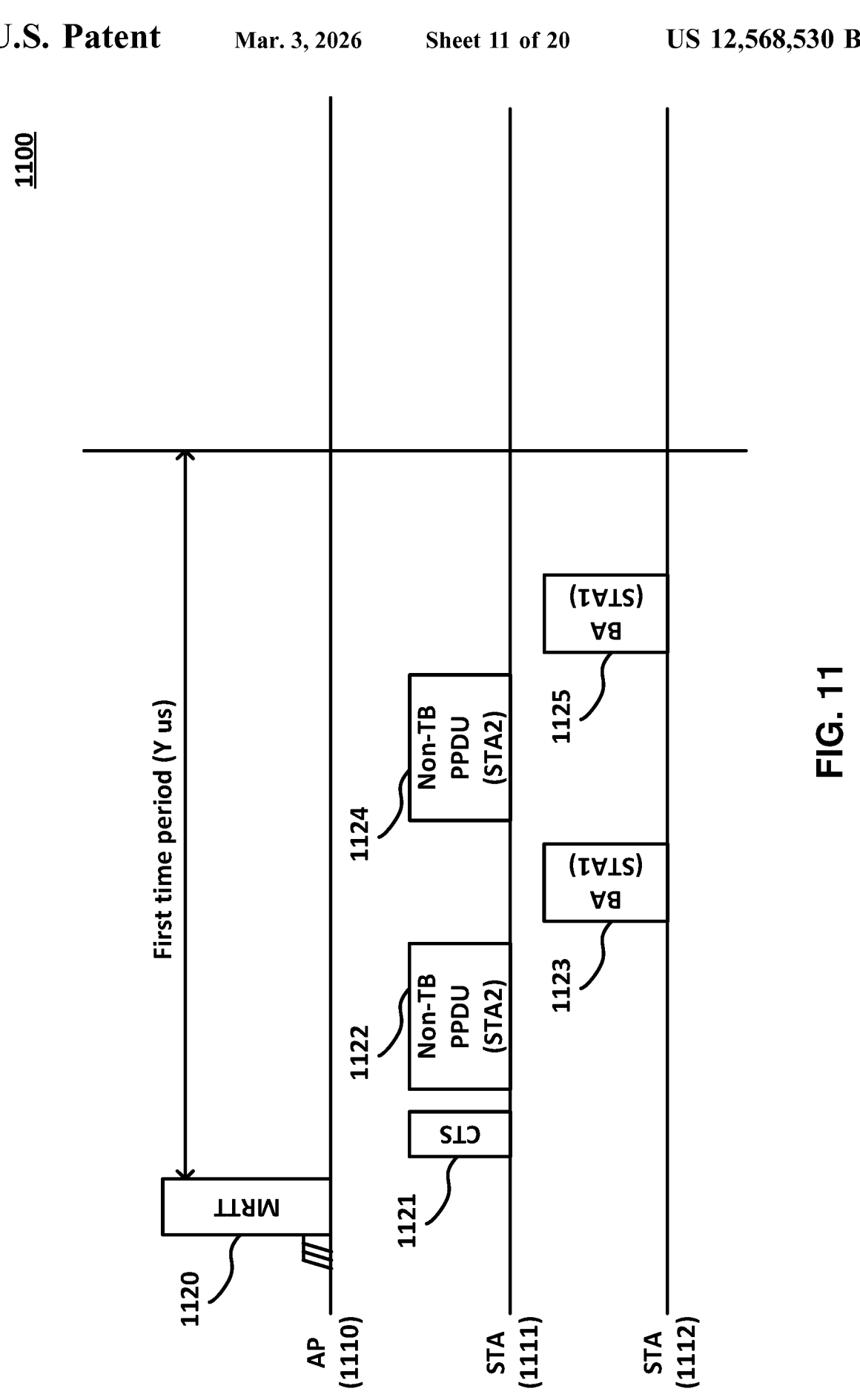
FIG. 11 illustrates an example of a TXS procedure (Mode=2).

FIG. 11 illustrates an example 1100 of a TXS procedure (Mode=2). As shown in FIG. 11, the procedure may begin by an AP 1110 transmitting an MRTT frame 1120 to a STA 1111. MRTT frame 1120 may allocate a portion of an obtained TXOP to STA 1111 and may indicate a triggered TXOP sharing mode equal to 2. STA 1111 receiving MRTT 1120 may use the allocated time duration to transmit one or more non-TB PPDUs 1122, 1124 to a STA 1112.

In an example, MRTT frame 1120 may comprise a triggered TXOP sharing mode subfield and/or a first time period.

In an example, the first time period may indicate a portion of a time allocated by AP 1110 within an obtained TXOP. In an example, the first time period may be indicated by a subfield in MRTT frame 1120. In an example, the first time period may be set to a value of Y us.

In an example, the triggered TXOP sharing mode subfield may be set to 2. The triggered TXOP sharing mode subfield set to 2 may indicate that STA 1111 may transmit one or more non-TB PPDUs to AP 1110 or to a peer STA during the first time period. In an example, the peer STA may be a STA with a connection for P2P communication or direct communication with STA 1111. The one or more non-TB PPDUs may comprise a data frame, a control frame, a management frame, or an action frame.

For example, as shown in FIG. 11, MRTT frame 1120 may define a first time period of Y us. STA 1111 may transmit non-TB PPDUs 1122, 1124 comprising one or more data frame to STA 1112 during the first time period, preceded by a CTS frame 1121. In an example, STA 1112 may transmit one or more BA frames 1123, 1125 in response to the one or more data frames contained in non-TB PPDUs 1122, 1124 received from STA 1011.

Figure 12:
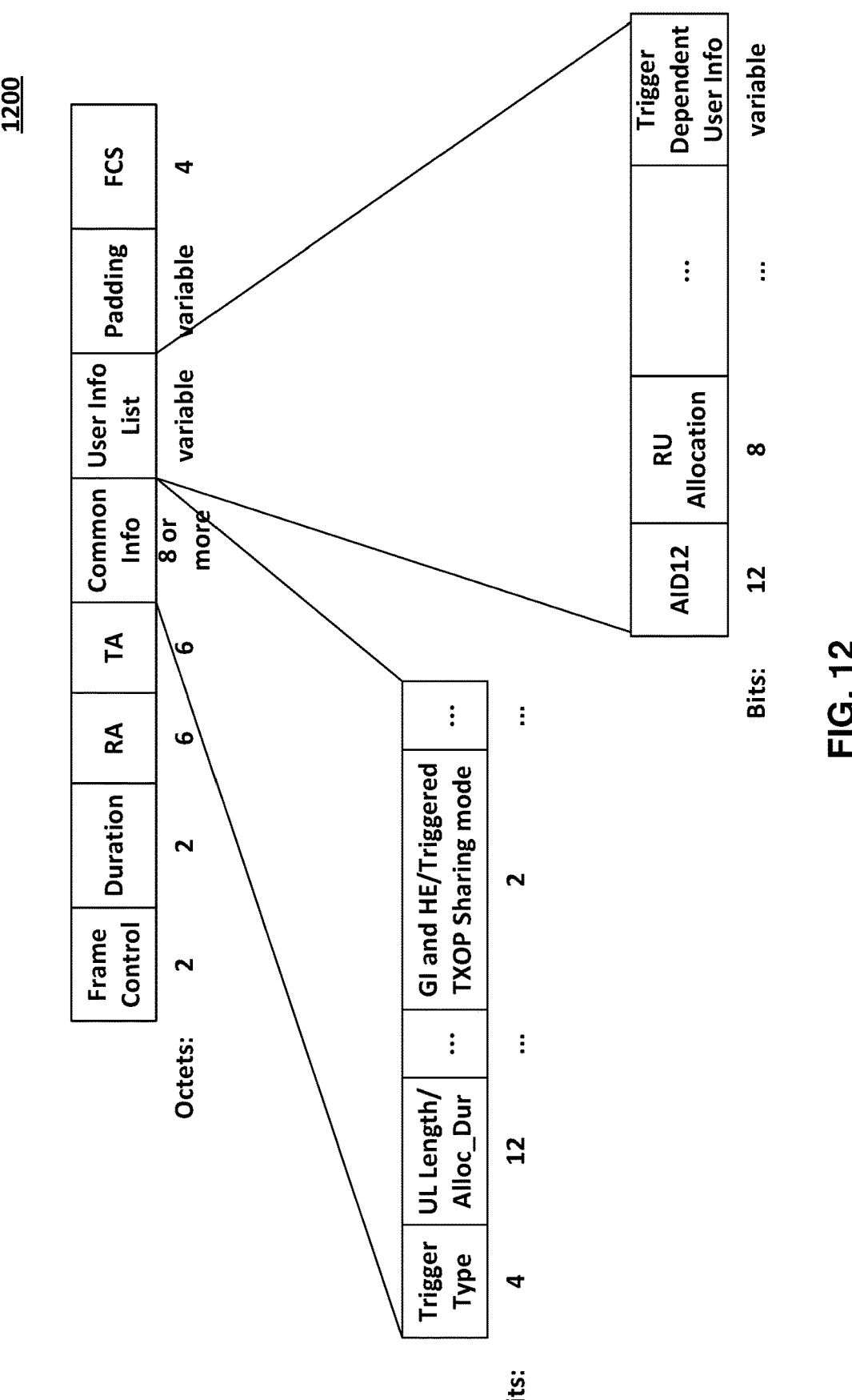
FIG. 12 is an example diagram of a multi-user request-to-send (MU-RTS) trigger frame which may be used in a TXS procedure.

FIG. 12 is an example diagram of an MU-RTS trigger frame which may be used in a TXS procedure.

In an example, the MU-RTS trigger frame may comprise a frame control field, a duration field, a receiver address (RA) field, a transmitter address (TA) field, a common info field, a user info list field, a padding field, and/or frame check sequence (FCS) field.

In an example, the common info field may be a high-efficiency (HE) variant common info field or an extremely high throughput (EHT) variant common info field.

In an example, an EHT variant common info field may comprise one or more of the following subfields: trigger type, UL length/Allocation Duration, more TF, CS required, UL BW, GI and HE/EHT-LTF Type/Triggered TXOP sharing mode, number of HE/EHT-LTF symbols, LDPC extra symbol segment, AP Tx Power, Pre-FEC padding factor, PE disambiguity, UL spatial reuse, HE/EHT P160, special user info field flag, EHT reserved, reserved, or trigger dependent common info.

In an example, the trigger type subfield may indicate an MU-RTS trigger frame.

In an example, the GI and HE/EHT-LTF Type/Triggered TXOP sharing mode subfield may include a Triggered TXOP sharing mode subfield. In such a case, the MU-RTS trigger frame is called an MU-RTS TXS trigger (MRTT) frame.

In an example, the triggered TXOP sharing mode subfield may be set to a non-zero value (e.g., 1 or 2).

In an example, the UL length/allocation duration subfield may include an allocation duration subfield (e.g., when the triggered TXOP sharing mode subfield is set to a non-zero value). The allocation duration subfield may indicate a time allocated by an AP transmitting the MU-RTS trigger frame. The allocated time may be a portion of the time of an obtained TXOP by the AP. In an example, the allocation duration subfield may be present in a user info field of the MU-RTS trigger frame instead of the common info field. In an example embodiment, the allocation duration subfield may indicate a first time period.

In an example, the triggered TXOP sharing mode subfield may indicate that a STA indicated by an AID12 subfield (of the user info list field) of the MU-RTS trigger frame (which corresponds to an MRTT frame in this case) may transmit one or more non-TB PPDUs to the AP during the time indicated by the allocation duration subfield. In this case, the triggered TXOP sharing mode subfield may be set to 1.

In an example, the triggered TXOP sharing mode subfield may indicate that a STA indicated by an AID12 subfield of the MU-RTS trigger frame (which corresponds to an MRTT frame in this case) may transmit one or more non-TB PPDUs to the AP or to a peer STA during the time indicated by the allocation duration subfield. In an example, the peer STA may be a STA with a connection for P2P communication or direct communication with the STA. In this case, the triggered TXOP sharing mode subfield may be set to 2.

In an example, the AID12 subfield of the MU-RTS trigger frame may indicate an association identifier (AID) of a STA that may use a time indicated by an allocation duration subfield of the MU-RTS trigger frame.

Figure 13:
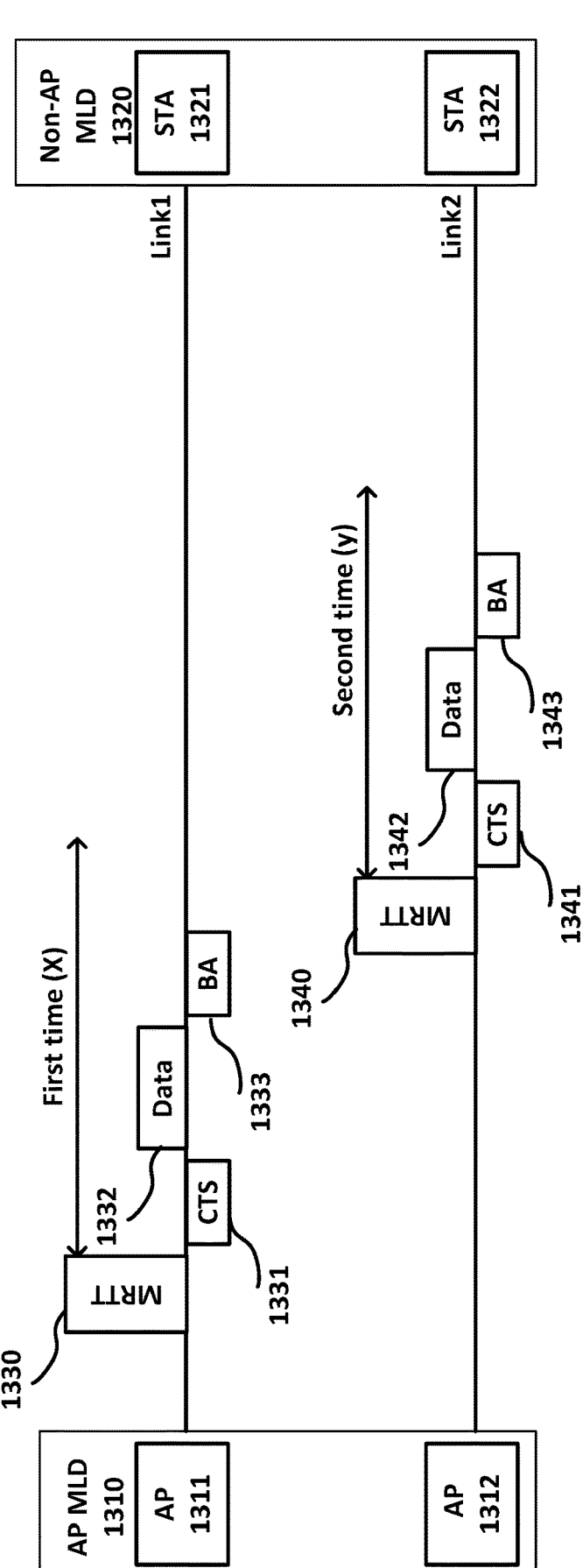
FIG. 13 is an example of a TXS procedure which may be used in a multi-link environment.

FIG. 13 illustrates an example of a TXS procedure which may be used in a multi-link environment. For the purpose of illustration, the example TXS procedure is described with reference to an example multi-link environment 1300. As shown in FIG. 13, example multi-link environment includes an AP MLD 1310 and a non-AP MLD 1320.

In an example, an AP 1311 and/or an AP 1312 may be affiliated with AP MLD 1310. A STA 1321 and/or a STA 1322 may be affiliated with non-AP MLD 11320. STA 1321 may be associated with AP 1311. STA 1321 and AP 1311 may be communicatively coupled on a first link (Link 1). STA 1322 may be associated with AP 1312. STA 1322 and AP 1312 may be communicatively coupled on a second link (Link 2).

In an example, AP 1311 may transmit an MU-RTS TXS Trigger (MRTT) frame 1330 to STA 1321 on link 1. The MRTT frame 1330 may comprise a triggered TXOP sharing mode subfield set to 1, an AID subfield indicating an AID of STA 1321, and/or a first time period (e.g., X us, where X is an integer value larger than 0).

In an example, STA 1321 may transmit a CTS frame 1331 in response to the received MRTT frame 1330 on link 1.

In an example, STA 1321 may transmit a data frame 1332 (e.g., in a non-TB PPDU) to AP 1311 on link 1 during the first time period (e.g., X us). AP 1311 may transmit a BA frame 1333 in response to data frame 1332 on link 1 during the first time period.

In an example, AP 1312 may transmit an MRTT frame 1340 to STA 1322 on link 2. The MRTT frame 1340 may comprise a triggered TXOP sharing mode subfield set to 1, an AID subfield indicating an AID of STA 1322, and/or a second time period (e.g., Y us, Y is an integer value larger than 0).

In an example, STA 1322 may transmit a CTS frame 1341 in response the received MRTT frame 1340 on link 2.

In an example, STA 1322 may transmit a data frame 1342 (e.g., in a non-TB PPDU) to AP 1312 on link 2 during the second time period (e.g., Y us). AP 1312 may transmit a BA frame 1343 in response to data frame 1342 on link 2 during the second time period (e.g., Y us).

Figure 14:
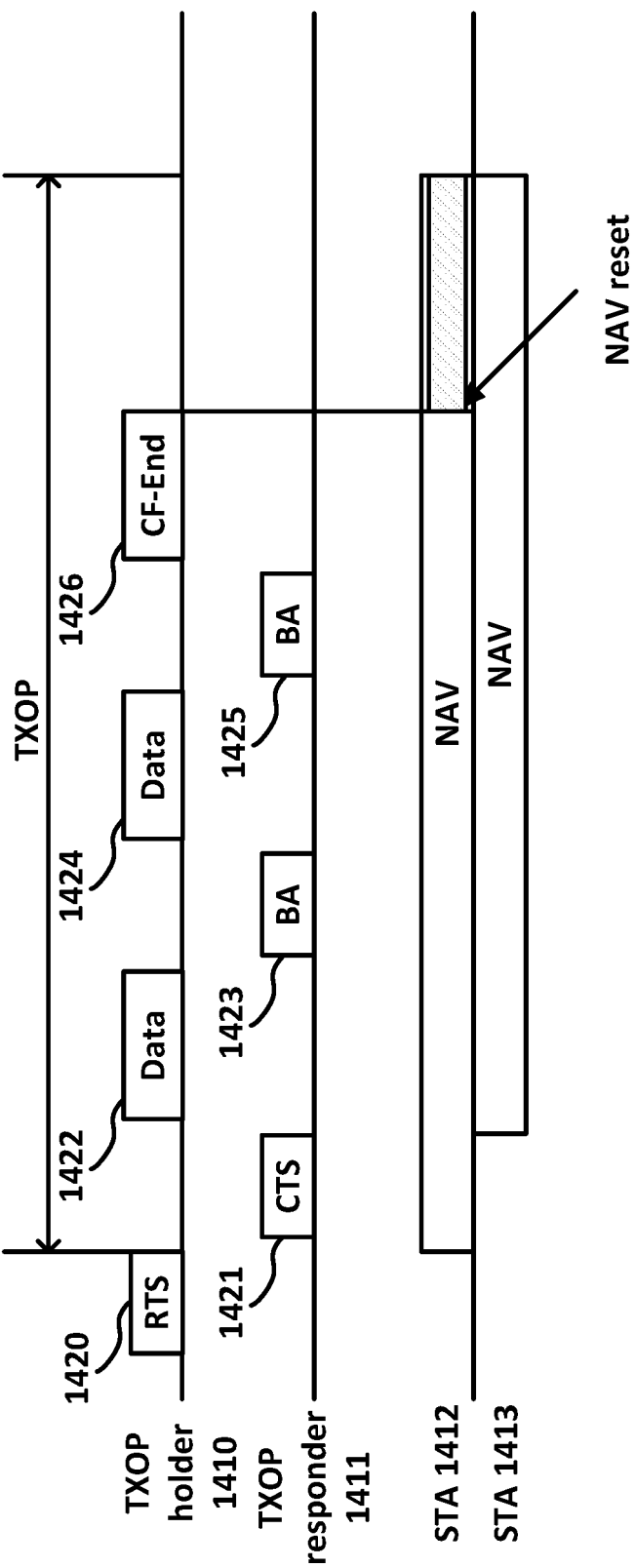
FIG. 14 illustrates an example TXOP truncation procedure.

FIG. 14 illustrates an example TXOP truncation procedure. For the purpose of illustration, the example TXOP truncation procedure is described with reference to an example environment 1400. As shown in FIG. 14, example environment 1400 may include a TXOP holder 1410, a TXOP responder 1411, a STA 1412, and a STA 1413. The TXOP holder may be a QoS STA that has either been granted a TXOP by the hybrid coordinator (HC) or successfully contended for a TXOP. The TXOP responder may be a STA that transmits a frame in response to a frame received from a TXOP holder during a frame exchange sequence, but that does not acquire a TXOP in the process.

In an example, TXOP holder 1410 may transmit an RTS frame 1420 to TXOP responder 1411 to initiate a TXOP. The TXOP responder 1411 may transmit a CTS frame 1421 in response to the RTS frame 1420.

Upon receiving the RTS frame 1420, STA 1412 may set/update its NAV based on duration information of the received RTS frame 1420. Upon receiving the CTS frame 1421, STA 1413 may set/update its NAV based on duration information of the received CTS frame 1421.

Upon receiving the CTS frame 1421 from the TXOP responder 1411, the TXOP holder 1410 may transmit one or more data frames 1422, 1424 to the TXOP responder 1411 during the TXOP. The TXOP responder 1411 may transmit one or more BA frame 1423, 1425 in response to the data frames 1422, 1424 to the TXOP holder 1410 during the TXOP.

The TXOP holder 1410 may transmit a Contention Free-End (CF-End) frame 1426 within the TXOP to truncate the TXOP. Upon receiving the CF-End frame 1426, STA 1412 may reset its NAV (e.g., set the NAV to 0).

Figure 15:
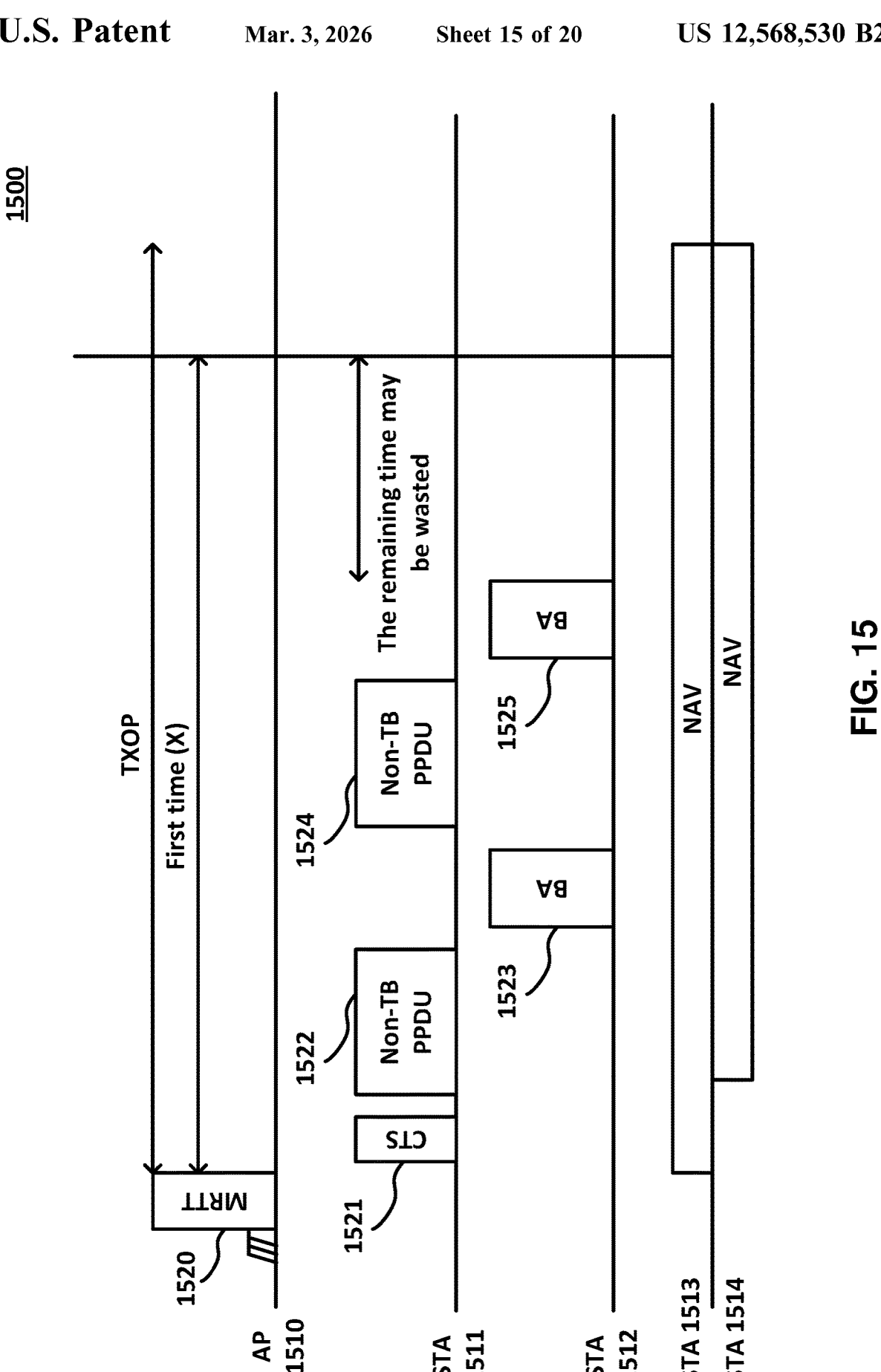
FIG. 15 illustrates an example of a TXS procedure.

FIG. 15 illustrates an example of a TXS procedure. For the purpose of illustration, the example TXS procedure is described with reference to an example environment 1500. As shown in FIG. 15, example environment 1500 may include an AP 1510 and STAs 1511, 1512, 1513, and 1514.

In an example, STA 1511 may be associated with AP 1510. AP 1510 may allocate a portion of an obtained TXOP to STA 1511 by transmitting an MRTT frame 1520. STA 1511 may transmit a CTS frame 1521 to AP 1510 in response to the MRTT frame 1520.

In an example, the MRTT frame 1520 may comprise a triggered TXOP sharing mode subfield, an AID subfield indicating an AID of STA 1511, and/or a first time period (e.g., X us).

In an example, the first time period may indicate a portion of time allocated by AP 1510 within an obtained TXOP. In an example, the first time period may be indicated by a subfield (e.g., an allocation duration field) in the MRTT frame 1520. In an example, the first time period may be set to a value of X us (e.g., where X is an integer value larger than 0).

In an example, the triggered TXOP sharing mode subfield is set to 2. The triggered TXOP sharing mode subfield set to 2 may indicate that the allocated STA may transmit one or more non-TB PPDUs to the AP or to a peer STA during the first time period. The peer STA is a STA that has a direct communication with the allocated STA. The one or more non-TB PPDUs may comprise a data frame, a control frame, a management frame, or an action frame. In an example, as shown in FIG. 15, STA 1511 may transmit one or more non-TB PPDUs 1522, 1524 comprising a data frame to STA 1512 during the first time period. In an example, STA 1512 may transmit one or more BA frame 1523, 1525 in response to the non-TB PPDUs 1522, 1524 received from STA 1511.

In an example, STA 1513 may set/update its NAV based on the duration information of the MRTT frame 1520. STA 1514 may set/update its NAV based on the duration information of the CTS frame 1521. STA 1513 and/or STA 1514 may defer channel access while their respective NAVs have a non-zero value.

In existing technologies, in a TXS procedure, an AP may allocate a portion of the time within an obtained TXOP (first time period) to an associated STA by transmitting an MRTT frame and the first period may be used by the associated STA as shown in FIG. 15. As the first time period is allocated to the associated STA, the AP, as TXOP holder, may not truncate the TXOP until the end of the first time period, even when the associated STA terminates its transmissions before the end of the first period. And, as the associated STA is not the TXOP holder, the associated STA also may not cause truncation of the TXOP by transmitting a CF-End frame. As such, when the associated STA terminates its transmissions before the end of the first time period, any remaining time of the TXOP will not be used for any transmissions and will thus be lost. Channel resources may thus be lost.

Example embodiments provide mechanisms to prevent or reduce the waste of channel resources that can happen in the existing TXS procedure. FIG. 16 to FIG. 20 illustrate some example embodiments.

Figure 16:
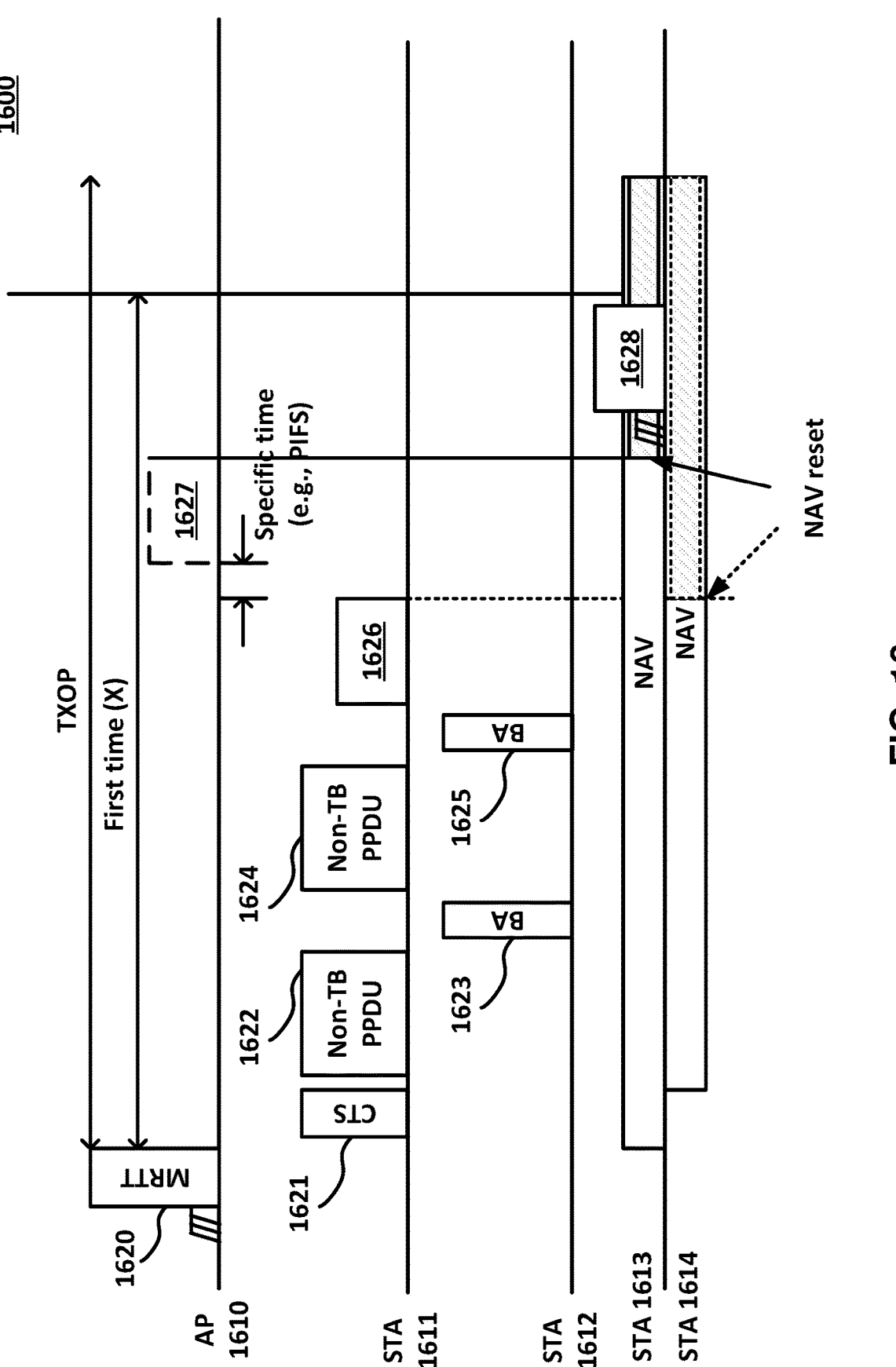
FIG. 16 illustrates an example of a TXS time termination mechanism which may be used in a TXS procedure.

FIG. 16 illustrates an example of a TXS time termination mechanism which may be used in a TXS procedure. For the purpose of illustration, the example TXS time termination mechanism is described with reference to an example environment 1600. As shown in FIG. 16, example environment 1600 includes an AP 1610 and STAs 1611, 1612, 1613, and 1614.

In an example, STA 1611 may be associated with AP 1610. AP 1610 may allocate a portion of an obtained TXOP to STA 1611 by transmitting an MRTT frame 1620. STA 1611 may transmit a CTS frame 1621 to AP 1610 in response to the MRTT frame 1620.

In an example, the MRTT frame 1620 may include a triggered TXOP sharing mode subfield, an AID subfield indicating an AID of STA 1611, and/or a first time period.

In an example, the first time period may indicate a portion of time allocated by AP 1610 within the obtained TXOP. In an example, the first time period may be indicated by a subfield (e.g., an allocation duration field) in the MRTT frame 1620. In an example, the first time period may be set to a value of X us.

In an example, the triggered TXOP sharing mode subfield is set to 2. The triggered TXOP sharing mode subfield set to 2 may indicate that the allocated STA may transmit one or more non-TB PPDUs to the AP or to a peer STA during the first time period. In an example, as shown in FIG. 16, STA 1611 may transmit the one or more non-TB PPDUs 1622, 1624 comprising a data frame to STA 1612, a peer STA, during the first time period. In an example, STA 1612 may transmit BA frames 1623, 1625 in response to the one or more non-TB PPDUs 1622, 1624 comprising data frames received from STA 1611.

In an example, STA 1613 may set or update its NAV based on the duration information of the received MRTT frame 1620. STA 1614 may set or update its NAV based on the duration information of CTS frame 1621. STAs 1613 and 1614 may defer channel access while their respective NAVs have a non-zero value.

In an example, STA 1611 may transmit a frame 1626 to AP 1610. Frame 1626 may indicate termination of the first time period or the remaining time of the first time period that STA 1611 does not intend to use. In embodiments, frame 1626 may be, without limitation, one of the following frames:

- a frame with a more data (MD) subfield set to 0;
- a QoS data/null frame with an EOSP subfield set to 1;
- a frame indicating an empty buffer;
- a frame with a power management subfield set to 1;
- a QoS data/null frame with an aggregated control (A-Control) field indicating termination of the first time period;
- a CF-end frame;
- a PPDU comprising a CF-end frame; or
- an aggregate MAC protocol data unit (A-MPDU) comprising a CF-end frame.

Based on frame 1626, AP 1610 may know that STA 1611 has finished transmission during the first time period (i.e., the remaining time of the first time period may not be used by STA 1611). In an embodiment, AP 1610 may transmit a frame 1627 after receiving frame 1626. Frame 1627 may be a CF-End frame, a data frame, a control frame, a management frame, or an action frame.

In an embodiment, the AP may transmit a CF-end frame as frame 1627 to truncate the current TXOP after a specific time. In an example, the specific time may be one of: a short interframe space (SIFS), a priority interframe space (PIFS), a distributed interframe space (DIFS), an extended inter-frame space (EIFS), or another time value (e.g., (EIFS+PIFS), enhanced distributed channel access (EDCA) channel access time (e.g., arbitration interframe space (AIFS)+a backoff count), or EDCA channel access time+a fixed time (e.g., SIFS, PIFS, DIFS, EIFS, 20 us, BA transmission time)).

In an example, STA 1611 may transmit a CF-end frame as frame 1626 to AP 1610. AP 1610 may transmit a CF-end frame as frame 1627 PIFS after receiving frame 1626.

In an example, STA 1613 which receives frame 1627 (e.g., a CF-end frame) from AP 1610 may reset its NAV (e.g., set the NAV to 0) and may then access a channel to transmit a frame 1628 using EDCA parameters. Frame 1628 may be a data frame, a control frame, a management frame, or an action frame. In an example, STA 1614 which receive frame 1626 (e.g., a CF-end frame) may reset its NAV (e.g., set the NAV to 0).

Figure 17:
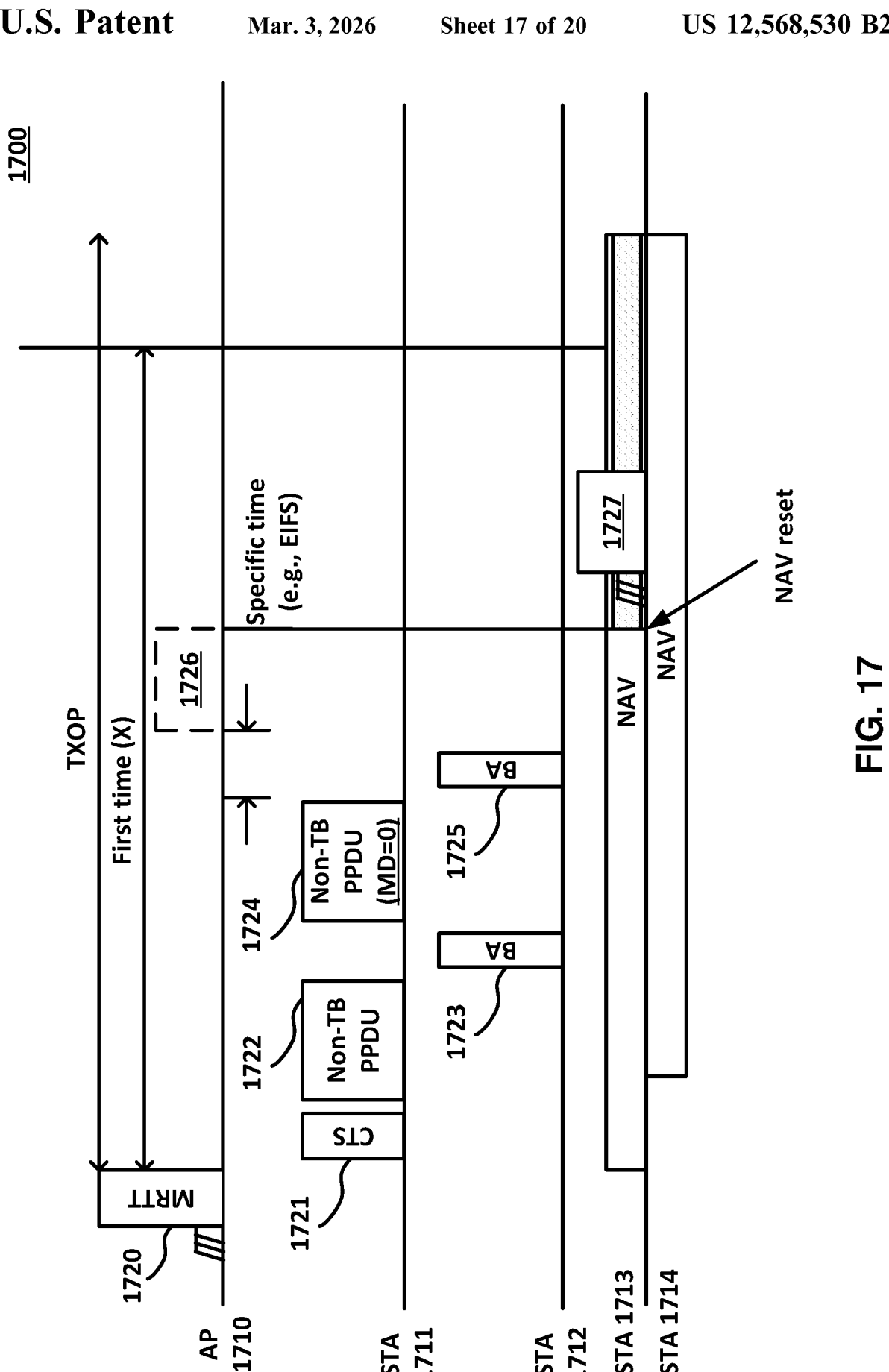
FIG. 17 illustrates another example of a TXS time termination mechanism which may be used in a TXS procedure.

FIG. 17 illustrates another example of a TXS time termination mechanism which may be used in a TXS procedure. For the purpose of illustration, the example TXS time termination mechanism is described with reference to an example environment 1700. As shown in FIG. 17, example environment 1700 includes an AP 1710 and STAs 1711, 1712, 1713, and 1714

In an example, STA 1711 may be associated with AP 1710. AP 1710 may allocate a portion of an obtained TXOP to STA 1711 by transmitting an MRTT frame 1720. STA 1711 may transmit a CTS frame 1721 to AP 1710 in response to the MRTT frame 1720.

In an example, the MRTT frame 1720 may include a triggered TXOP sharing mode subfield, an AID subfield indicating an AID of STA 1711, or a first time period.

In an example, the first time period may indicate a portion of time allocated by AP 1710 within the obtained TXOP. In an example, the first time period may be indicated by a subfield (e.g., an allocation duration field) in the MRTT frame 1720. In an example, the first time period may be set to a value of X us.

In an example, the triggered TXOP sharing mode subfield is set to 2. The triggered TXOP sharing mode subfield set to 2 may indicate that the allocated STA may transmit one or more non-TB PPDUs to the AP or to a peer STA during the first time period. In an example, as shown in FIG. 17, STA 1711 may transmit the one or more non-TB PPDUs 1722, 1724 comprising a data frame to STA 1712, a peer STA, during the first time period. In an example, STA 1712 may transmit BA frames 1723, 1725 in response to the one or more non-TB PPDUs 1722, 1724 comprising data frames received from STA 1711.

In an example, STA 1711 may include a frame with an MD subfield set to 0 in the last transmitted non-TB PPDU 1724. The frame with the MD subfield set to 0 may indicate that STA 1711 does not intend to use the remaining time of the first time period or that the first time period may be terminated.

Based on the frame with the MD set to 0, AP 1710 may know that STA 1711 has finished transmission during the first time period or that the remaining time of the first time period may not be used by STA 1711. In an embodiment, AP 1710 may transmit a frame 1726 after receiving the frame with the MD subfield set to 0. Frame 1726 may be a CF-End frame, a data frame, a control frame, a management frame, or an action frame.

In an embodiment, AP 1710 may transmit a CF-End frame as frame 1726 to truncate the current TXOP a specific time after receiving non-TB PPDU 1724. In an example, the specific time may be one of: SIFS, PIFS, DIFS, EIFS, or another time value (e.g., (EIFS+PIFS), EDCA channel access time (e.g., AIFS+a backoff count), or EDCA channel access time+a fixed time (e.g., SIFS, PIFS, DIFS, EIFS, 20 us, BA transmission time)). In example environment 1700, AP 1710 may transmit a CF-End frame 1726 an EIFS after the non-TB PPDU 1724.

In an example, STA 1713 may set or update its NAV based on the duration information of MRTT frame 1720. STA 1714 may set or update its NAV based on the duration information of CTS frame 1721. STA 1713 and/or STA 1714 may defer channel access while their respective NAVs have a non-zero value.

In an example, STA 1713 which receives frame 1726 (e.g., a CF-end frame) from AP 1710 may reset its NAV and may then access a channel to transmit a frame 1727 using EDCA parameters. Frame 1727 may be a data frame, a control frame, a management frame, or an action frame.

Figure 18:
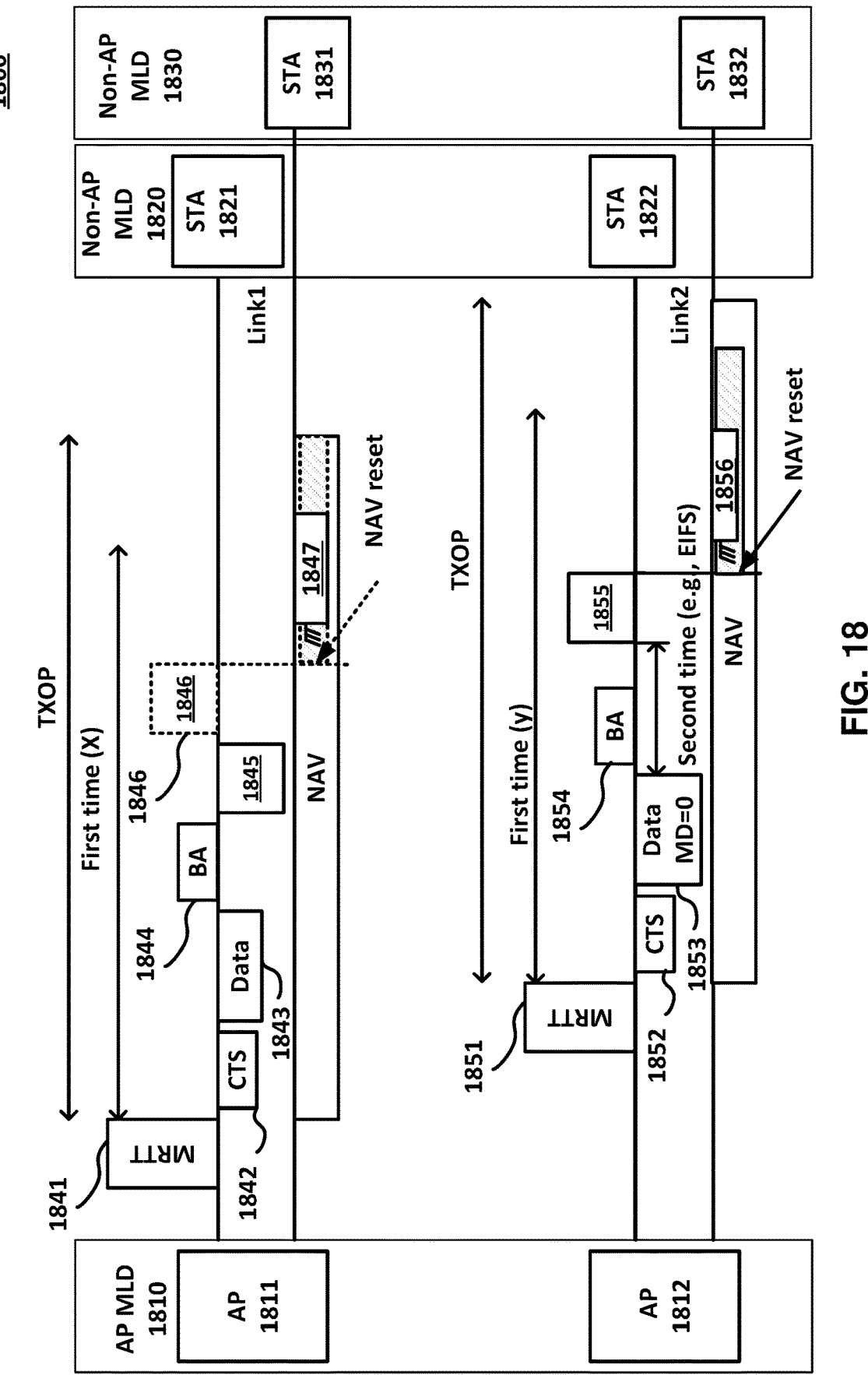
FIG. 18 illustrates an example of a TXS time termination mechanism which may be used in a multi-link environment.

FIG. 18 illustrates an example of a TXS time termination mechanism which may be used in a multi-link environment. For the purpose of illustration, the example TXS termination mechanism is described with reference to an example multi-link environment 1800. As shown in FIG. 18, example multi-link environment 1800 includes an AP MLD 1810, a non-AP MLD 1820, and a non-AP MLD 1830.

In an example embodiment, a STA 1821 and a STA 1822 may be affiliated with non-AP MLD 1820. A STA 1831 and a STA 1832 may be affiliated with non-AP MLD 1830. An AP 1811 and AP 1812 may be affiliated with AP MLD 1810.

STAs 1821 and 1831 may each be associated with AP 1811 and may communicate with AP 1811 on a first link (link 1). STAs 1822 and 1832 may each be associated with AP 1812 and may communicate with AP 1812 on a second link (link 2).

In an example embodiment, AP 1811 may allocate a portion of an obtained TXOP to STA 1821 by transmitting on link 1 an MRTT frame 1841. MRTT frame 1841 may include a triggered TXOP sharing mode subfield set to 1, an AID subfield indicating an AID of STA 1821, and/or a first time period (e.g., X us). STA 1821 may transmit on link 1 a CTS frame 1842 to AP 1811 in response to the MRTT frame 1841.

In an example embodiment, AP 1812 may allocate a portion of an obtained TXOP to STA 1822 by transmitting on link 2 an MRTT frame 1851. MRTT frame 1851 may include a triggered TXOP sharing mode subfield set to 1, an AID subfield indicating an AID of STA 1822, and/or a second time period (e.g., Y us). STA 1822 may transmit on link 2 a CTS frame 1852 to AP 1812 in response to the MRTT frame 1851.

In an embodiment, STA 1831 may set its NAV based on the duration information of MRTT frame 1841 transmitted on link 1. STA 1832 may set its NAV based on the duration information of MRTT frame 1851 transmitted on link 2.

The triggered TXOP sharing mode subfield set to 1 in an MRTT frame may indicate that a STA allocated by the MRTT frame may transmit one or more non-TB PPDUs to the AP transmitting the MRTT frame. For example, as shown in FIG. 18, STA 1821 may transmit a non-TB PPDU comprising a data frame 1843 to AP 1811 on link 1. STA 1822 may transmit a non-TB PPDU comprising a data frame 1853 to AP 1812 on link 2.

AP 1811 may transmit to STA 1821 a BA frame 1844 in response to data frame 1843 received on link 1 during the first time period (X us). AP 1812 may transmit to STA 1822 a BA frame 1854 in response to data frame 1853 received on link 2 during the second time period (Y us).

In an example, STA 1821 may transmit to AP 1811 a frame 1845 (e.g., a CF-End frame) after receiving BA frame 1844 from AP 1811 to indicate that the remaining time of the first time period is not intended to be used. AP 1811 may transmit a frame 1846 (e.g., a CF-End frame) after receiving frame 1845 from STA 1821 to indicate truncation of the obtained TXOP.

In an embodiment, STA 1831 may reset its NAV (e.g., set its NAV to zero) when it receives frame 1845 and may then access the channel to transmit a frame 1847. In another embodiment, as shown in FIG. 18, STA 1831 may reset its NAV when it receives frame 1846 and may then access the channel to transmit frame 1847.

In an example, data frame 1853 transmitted by STA 1822 may include an MD subfield set to 0 to indicate that the remaining time of the second time period is not intended to be used. AP 1812 may transmit a frame 1855 a specific time after receiving the data frame 1853 with the MD subfield set to 0 from STA 1821 to indicate truncation of the obtained TXOP. The fourth frame may be a CF-End frame. The specific time may be a PIFS duration. In an example, AP 1812 may transmit frame 1855 a second specific time after transmitting the BA frame 1854 in response to data frame 1853. The second specific time may be a PIFS duration.

In an example, STA 1832 may reset its NAV (e.g., set its NAV to zero) based on frame 1855 and may then access the channel to transmit a frame 1856. The fifth frame may be a data frame, a control frame, a management frame, or an action frame.

FIG. 19 illustrates an example process 1900 which may be used in a TXS time termination procedure. Example process 1900 may be performed by an AP.

As shown in FIG. 19, process 1900 may include, in step 1910, transmitting to a STA a first frame indicating a first time period, an AID of the STA, and/or a TXS mode indicating a TXS procedure.

In an embodiment, the first frame is an MRTT frame.

In an embodiment, the first time period may be allocated to the STA. The STA may be not a holder of the TXOP. The first time period may be indicated by an allocation duration subfield of the first frame. The AID may be indicated by an AID12 subfield of the first frame.

In an embodiment, the triggered TXOP sharing procedure may include the AP allocating the first time period within an obtained TXOP to the STA. The triggered TXOP sharing mode may indicate that the STA transmits PPDU(s) addressed only to the AP during the first time period. The triggered TXOP sharing mode may indicate that the STA transmits PPDU(s) addressed to the AP or to another STA during the first time period.

In an embodiment, the AP may be affiliated with an AP multi-link device (MLD). The STA may be affiliated with a non-AP multi-link device (MLD).

In step 1920, process 1900 may include receiving from the STA a second frame in response to the first frame. The second frame may be a CTS frame or a PPDU. In an embodiment, the second frame is received a SIFS duration after the first frame.

In step 1930, process 1900 may include receiving a third frame indicating that a remaining time of the first time period is not intended to be used by the STA. The third frame may be, without limitation, one of the following frames:
a frame with an MD subfield set to 0;
a QoS data/null frame with an EOSP subfield set to 1;
a frame indicating an empty buffer;
a frame with a power management subfield set to 1;
a QoS data/null frame with an A-Control field indicating termination of the first time period;
a CF-end frame;
a PPDU comprising a CF-end frame; or
an A-MPDU comprising a CF-end frame.

Optionally, in step 1940, process 1900 may include transmitting a fourth frame indicating truncation of a TXOP of the TXS procedure in response to receiving the third frame during the first time period. The fourth frame may be a CF-end frame, a QoS data/null frame including an A-control field, a control frame, or an action frame. The QoS data/null frame including an A-control field, the control frame, or the action frame may include information indicating truncation of the TXOP of the TXS procedure.

In an embodiment, process 1900 may further include receiving, from the STA, a fifth frame during the first time period; and transmitting, to the STA, an immediate response frame in response to the fifth frame. The fifth frame may be a QoS data frame, a management frame, a control frame, or an action frame.

FIG. 20 illustrates an example process 2000 which may be used in a TXS time termination procedure. Example process 2000 may be performed by a STA.

As shown in FIG. 20, in step 2010, process 2000 may include receiving from an AP a first frame indicating a first time period, an AID of the STA, and/or a triggered TXOP sharing mode indicating a TXS procedure.

In step 2020, process 2000 may include transmitting to the AP a second frame (e.g., a CTS frame) in response to the first frame.

In step 2030, process 2000 may include transmitting a third frame to the AP or to a peer STA during the first time period. The third frame may be transmitted based on a value (e.g., 1 or 2) indicated in the triggered TXOP sharing mode indicated in the first frame from the AP. The third frame may be a QoS data frame, a management frame, a control frame, or an action frame.

Optionally, in step 2040 process 1900 may include receiving, from the AP or the peer STA, an immediate response frame (e.g., an Ack frame or a BA frame) in response to the third frame.

In step 2050, process 200 may include transmitting a fourth frame indicating that a remaining time of the first time period is not intended to be used by the STA. The fourth frame may be, without limitation, one of the following frames:
a frame with an MD subfield set to 0;
a QoS data/null frame with an EOSP subfield set to 1;
a frame indicating an empty buffer;
a frame with a power management subfield set to 1;
a QoS data/null frame with an A-Control field indicating termination of the first time period;
a CF-end frame;
a PPDU comprising a CF-end frame; or
an A-MPDU comprising a CF-end frame.

The fourth frame may be included in a last PPDU sent by the STA during the first time period.

The invention claimed is:

1. A station (STA) comprising:

one or more processors; and memory storing instructions that, when executed by the one or more processors, cause the STA to:

receive, from an access point (AP), a first frame indicating:

a first time period of a transmission opportunity (TXOP); and a triggered TXOP sharing (TXS) mode;

transmit, to the AP or to a peer STA, based on the TXS mode, a second frame during the first time period; and transmit, to the AP, during the first time period, a third frame comprising a subfield set to 0 to indicate that a physical layer protocol data unit (PPDU) carrying the third frame is a last transmission by the STA during the first time period.

2. The STA of claim 1, wherein the instructions, when executed by the one or more processors, further cause the STA to receive, from the AP, a fourth frame indicating truncation of the TXOP in response to transmitting the third frame during the first time period.

3. The STA of claim 2, wherein the fourth frame comprises a CF-End frame, a Quality of Service (QOS) data/null frame comprising an Aggregated control (A-control) field, a control frame, or an action frame.

4. The STA of claim 1, wherein the second frame comprises a Quality of Service (QOS) data frame, a management frame, a control frame, or an action frame.

5. The STA of claim 1, wherein the first frame comprises an association identifier (AID) equal to an AID of the STA indicating allocation of the first time period to the STA.

6. The STA of claim 1, wherein the instructions, when executed by the one or more processors, further cause the STA to receive, from the AP or the peer STA, an immediate response frame in response to the second frame.

7. The STA of claim 1, wherein the instructions, when executed by the one or more processors, further cause the STA to transmit, to the AP, a fourth frame in response to the first frame.

8. The STA of claim 7, wherein the fourth frame is a clear-to-send (CTS) frame or a PPDU.

9. The STA of claim 1, wherein the instructions, when executed by the one or more processors, further cause the STA to receive, during the first time period, a data frame transmitted by the AP after receiving the third frame.

10. An access point (AP) comprising:

one or more processors; and memory storing instructions that, when executed by the one or more processors, cause the AP to:

transmit, to a station (STA), a first frame indicating:

a first time period of a transmission opportunity (TXOP); and a triggered TXOP sharing (TXS) mode; and receive, from the STA, during the first time period, a second frame comprising a subfield set to 0 to indicate that a physical layer protocol data unit (PPDU) carrying the second frame is a last transmission by the STA during the first time period.

11. The AP of claim 10, wherein the instructions, when executed by the one or more processors, further cause the AP to transmit a third frame indicating truncation of the TXOP in response to receiving the second frame during the first time period.

12. The AP of claim 11, wherein the third frame is a CF-End frame, a Quality of Service (QoS) data/null frame comprising an Aggregated control (A-control) field, a control frame, or an action frame.

13. The AP of claim 10, wherein the instructions, when executed by the one or more processors, further cause the AP to:

receive, from the STA, a third frame during the first time period; and transmit, to the STA, an immediate response frame in response to the third frame.

14. The AP of claim 13, wherein the third frame comprises a Quality of Service (QOS) data frame, a management frame, a control frame, or an action frame.

15. The AP of claim 10, wherein the first frame comprises an association identifier (AID) equal to an AID of the STA indicating allocation of the first time period to the STA.

16. The AP of claim 10, wherein the instructions, when executed by the one or more processors, further cause the AP to receive, from the STA, a third frame in response to the first frame.

17. The AP of claim 16, wherein the third frame is a clear-to-send (CTS) frame or a PPDU.

18. The AP of claim 10, wherein the instructions, when executed by the one or more processors, further cause the AP to transmit a data frame, during the first time period, after receiving the second frame.

19. A non-transitory computer-readable medium comprising instructions that, when executed by one or more processors, cause a station (STA) to:

receive, from an access point (AP), a first frame indicating:

a first time period of a transmission opportunity (TXOP); and a triggered TXOP sharing (TXS) mode;

transmit, to the AP or to a peer STA, based on the TXS mode, a second frame during the first time period; and transmit, to the AP, during the first time period, a third frame comprising a subfield set to 0 to indicate that a physical layer protocol data unit (PPDU) carrying the third frame is a last transmission by the STA during the first time period.

20. The non-transitory computer-readable medium of claim 19, wherein the instructions, when executed by the one or more processors, further cause the STA to receive, during the first time period, a data frame transmitted by the AP after receiving the third frame.

* * * * *